(12) United States Patent
Chandler-Bradley et al.

(10) Patent No.: US 12,169,132 B1
(45) Date of Patent: Dec. 17, 2024

(54) GAMING TO IMPROVE ROUTE GUIDANCE

(71) Applicant: UIPCO, LLC, San Antonio, TX (US)

(72) Inventors: Jennifer Marie Chandler-Bradley, Tampa, FL (US); Gabrielle Diane Salazar, San Antonio, TX (US); Ivan Ortiz, Little Elm, TX (US); Yevgeniy Viatcheslavovich Khmelev, San Antonio, TX (US); Carol Lyn Lawrence, Fair Oaks Ranch, TX (US); Keegan Patrick Hayes, Whitestown, IN (US); Gregory Brian Meyer, San Antonio, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 237 days.

(21) Appl. No.: 18/050,590

(22) Filed: Oct. 28, 2022

Related U.S. Application Data

(60) Provisional application No. 63/273,251, filed on Oct. 29, 2021.

(51) Int. Cl.
*G01C 21/34* (2006.01)
*A63F 13/65* (2014.01)
(Continued)

(52) U.S. Cl.
CPC .......... *G01C 21/3461* (2013.01); *A63F 13/65* (2014.09); *A63F 13/803* (2014.09);
(Continued)

(58) Field of Classification Search
None
See application file for complete search history.

(56) References Cited

U.S. PATENT DOCUMENTS

| 11,565,709 B1* | 1/2023 | Caldwell | G06N 3/088 |
| 2004/0243299 A1* | 12/2004 | Scaer | G08G 1/202 |
| | | | 701/522 |

(Continued)

FOREIGN PATENT DOCUMENTS

| CN | 108876046 A * | 11/2018 | G06N 3/006 |

OTHER PUBLICATIONS

Tian; Machine translation of CN-108876046-A; Nov. 2018; espacenet.com (Year: 2018).*

(Continued)

*Primary Examiner* — David P. Merlino
(74) *Attorney, Agent, or Firm* — Plumsea Law Group, LLC

(57) ABSTRACT

A system and method for using gaming as a tool to determine optimum routes through areas that have experienced a disaster are provided. Due to the disaster, an area may have some destroyed roads and other infrastructure. In one embodiment, input data collected from people on the ground, drones, and other aerial vehicles can be used to generate a virtual simulation of the area. The virtual area may include renderings of destroyed roads and infrastructure. Once created, the virtual area may be uploaded to an online gaming environment where users can participate in online games that permit them to find the best routes through the virtual area between starting and destination points. Once optimal routes are found, the system may send these routes to navigation systems used by rescuers and other people in the area to help them navigate the disaster area.

20 Claims, 16 Drawing Sheets

(51) Int. Cl.
*A63F 13/803* (2014.01)
*G01C 21/36* (2006.01)
(52) U.S. Cl.
CPC ....... *G01C 21/3415* (2013.01); *G01C 21/365* (2013.01); *G01C 21/3691* (2013.01)

(56) References Cited

U.S. PATENT DOCUMENTS

| | | | | |
|---|---|---|---|---|
| 2005/0203922 A1* | 9/2005 | Uhlir | ....................... | A63F 13/10 |
| 2005/0251324 A1* | 11/2005 | Wiener | ............ | G08G 1/096844 |
| | | | | 701/414 |
| 2022/0242450 A1* | 8/2022 | Sokolov | ............. | G06Q 10/0635 |
| 2022/0274019 A1* | 9/2022 | Delmonico | ......... | G06F 16/9537 |

OTHER PUBLICATIONS

Wang; Safe Route Determination for First Responders in the Presence of Moving Obstacles; Mar. 2020; IEEE Transactions on Intelligent Transportation Systems, vol. 21, No. 3 (Year: 2020).*

Ganguly; Post-Disaster Relief by Vehicle Route Planning and Service Time Estimation in Case of Chennai Floods; 2017 (Year: 2017).*

* cited by examiner

GAMING TO IMPROVE ROUTE GUIDANCE

CROSS-REFERENCE TO RELATED APPLICATIONS

This application claims the benefit of U.S. Provisional Patent Application Ser. No. 63/273,251, filed on Oct. 29, 2021, for "Gaming to Improve Route Guidance," the entirety of which is hereby incorporated by reference.

TECHNICAL FIELD

The present disclosure generally relates to route optimization. The present disclosure more specifically relates to a method and system for finding optimal alternative routes in environments after a disaster occurs. After a disaster occurs, roads and other infrastructure may be destroyed, damaged, or otherwise blocked. Accordingly, it may be desirable to find alternative routes that avoid obstacles in roads and other infrastructure. It may be difficult to find good alternative routes due to a complexity of the damaged environment.

BACKGROUND

During a disaster, such as a natural disaster (weather, wildfire, earthquake, etc.) or a man-made disaster (terrorism, warfare, etc.), the disaster may damage or destroy infrastructure (such as roads, bridges, utilities, etc.).

Because of the damage to the infrastructure, alternative routes may help navigate areas with damaged infrastructure. However, in areas with damaged infrastructure, it may not be easy to successfully navigate such areas.

There is a need in the art for a system and method that addresses the shortcomings discussed above.

SUMMARY

In one aspect, a vehicle navigation system including a processor and machine-readable media is disclosed. The machine-readable media includes instructions which, when executed by the processor, cause the processor to receive information about a geographic area from a virtual area simulator. In addition, the instructions cause the processor to provide a virtual environment presenting a simulation of the geographic area to a user of an online gaming system, using the information about the geographic area. The instructions further cause to processor to receive input from the user to navigate through portions of the simulation while avoiding obstacles in the simulation, the input comprising actions for maneuvering a simulated vehicle from a starting point to a destination point. The instructions further cause the processor to determine effects of moving the simulated vehicle through the simulation based on the actions. The instructions further cause the processor to identify routes taken by the user from the starting point to the destination point, based on the effects. The instructions further cause the processor to analyze the routes to identify an optimal route based on at least one criterion. The instructions further cause the processor to generate map data including navigation data based on the optimal route. The instructions further cause the processor to provide the map data to a navigation system for use in navigating a user vehicle from the starting point to the destination point in the geographic area.

In another aspect, a vehicle navigation method is disclosed. The method includes a first step of receiving information about a geographic area from a virtual area simulator. The method includes a second step of providing a virtual environment presenting a simulation of the geographic area to a user of an online gaming system, using the information about the geographic area. The method also includes a third step of receiving input from the user to navigate through portions of the simulation while avoiding obstacles in the simulation, the input comprising actions for maneuvering a simulated vehicle from a starting point to a destination point. The method also includes a fourth step of determining effects of moving the simulated vehicle through the simulation based on the actions. Additionally, the method includes a fifth step of identifying routes taken by the user from the starting point to the destination point, based on the effects. The method also includes as sixth step of analyzing the routes to identify an optimal route based on at least one criterion. The method includes a seventh step of generating map data including navigation data based on the optimal route. Finally, the method includes an eighth step of providing the map data to a navigation system for use in navigating a user vehicle from the starting point to the destination point in the geographic area.

In another aspect, a vehicle navigation method is disclosed. The method includes a first step of receiving information about a geographic area from a virtual area simulator. The method includes a second step of providing a virtual environment presenting a simulation of the geographic area to a user of an online gaming system, using the information about the geographic area. The method also includes a third step of receiving input from the user to navigate through portions of the simulation while avoiding obstacles in the simulation, the input comprising actions for maneuvering a simulated vehicle from a starting point to a destination point. The method also includes a fourth step of determining effects of moving the simulated vehicle through the simulation based on the actions. Additionally, the method includes a fifth step of identifying routes taken by the user from the starting point to the destination point, based on the effects. The method also includes as sixth step of analyzing the routes to identify an optimal route based on at least one criterion. The method includes a final step of providing the optimal route to the user vehicle for use in navigating the user vehicle from the starting point to the destination point in the geographic area.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
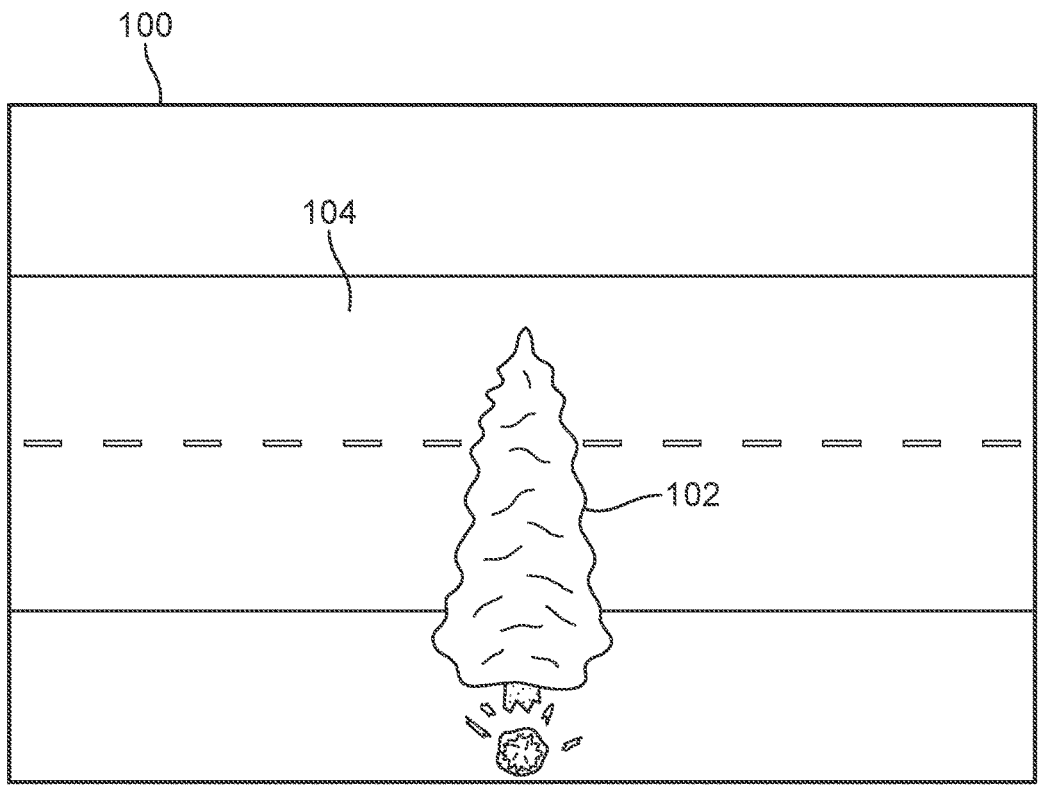
FIG. 1 shows a geographic area with a downed tree, according to an embodiment.

Embodiments provide a system and method for finding available routes through an area affected by a disaster in a more effective and efficient manner. The embodiments gather information about the area affected by the disaster and then simulate the area. By gathering the information about the area affected by the disaster, a system may provide a simulation including obstacles present in the real-world area. Such obstacles interfere with navigation. Users can interact with the simulation by playing a game that allows the users to experiment with different routes for navigating the simulated environment.

Accordingly, users may try out different strategies for avoiding the obstacles while finding ways to travel between points in the virtual area affected by the disaster. Because of the obstacles present because of the disaster, ordinary routes are no longer available. The proposed system and methods use the simulation to allow users to experiment with multiple alternative routes. Users learn how to travel successfully through the area affected by the disaster with damaged infrastructure.

The proposed system and method use gaming as a tool to determine optimum routes through areas that have experienced a disaster. Such an area may have some destroyed roads and other infrastructure. In one embodiment, input data may be used to generate a virtual simulation of the area. Such input data may be collected from people on the ground, drones, and other aerial vehicles. The virtual area may include renderings of damaged roads and infrastructure.

Once created, the virtual area can be uploaded to an online gaming environment. The online gaming environment allows users to participate in online games. Such games require users to find the best routes through the virtual area. Once the users find optimal routes, the system may send these routes to navigation systems. Rescuers and other people in the area may use such navigation systems to help them navigate the disaster area.

The embodiments simulate an area with damaged infrastructure. For example, infrastructure may include roads, airports, ports, railways, energy, utilities, education, healthcare, social institutions, etc. However, in this disclosure, infrastructure refers to structures that allow a vehicle to travel across a geographic area, such as roads, bridges, paths, tunnels, etc.

In some embodiments, damaged infrastructure may involve multiple forms of damage. Generally, damaged infrastructure involves physical damage (a tree falls on a road, a powerline collapses after a storm). The damage may also involve other types of damage such as electronic/virtual damage after a cyber-attack. In this disclosure, physical damage is the most relevant form of damage.

Some embodiments simulate a damaged area in various ways. The embodiments may begin with preexisting geographic information associated with the damaged area. The preexisting information provides a foundation to construct a virtual environment to simulate the damaged area.

Some embodiments may modify the preexisting geographic information based on gathered information. Such modification reflects the effects of the disaster on the damaged area in a simulation. Alternatively, some embodiments build a simulation directly from information gathered from the damaged area itself, after the damage occurs.

At least one user interacts with the simulation of the damaged area to establish optimal routes for navigation. Such interaction may take the form of a game. A user plays an online game, and experiences the simulated environment from a first-person or third-person perspective, as non-limiting examples.

The user's interaction with the simulation may involve physically moving through the simulation. The user's moves subject to the placement of obstacles and dangerous areas in the simulation. The simulation may also provide ways for the users to interact with the simulation. The interaction allows the users to navigate the simulation. These interactions include physical interactions with elements of the simulation. The physical interactions include moving objects in the simulation and modifying objects in the simulation. As an example of moving an object, the simulation may allow a user to move a branch of a fallen tree out of his or her way. As an example of modifying an object, the simulation may allow a user to cut a fallen tree into pieces to create a passable route.

Based on the user's interaction, the embodiments may track movements and/or actions by the user. The movements and/or actions correspond to routes to navigate the damaged area. The embodiments may further determine an optimal route. The embodiments then use the optimal route from the simulation for actual navigation. For example, the embodiments provide information to a navigation system. Examples of a navigation system include a geographic information system (GIS) and a vehicle navigation system. The vehicle navigation system may be a part of a motor vehicle, such as a navigation system physically integrated into the vehicle.

An embodiment may send updated GIS information to a navigation system on a user's phone or other another electronic device, such as a mobile electronic device. For example, the mobile electronic device may be a phablet, a personal digital assistant, a tablet, a laptop, or a screen integrated into a vehicle, as non-limiting examples. However, the navigation systems are not limited to these examples and embodiments may use other navigation systems.

The updated GIS information may include information about damages to different types of infrastructure. In general, the damage consists of blocked routes and other obstacles. Information reflects blocked roadways, new emergency roadways/detours (or paths), and other information that relates to how the geography, roads, and/or infrastructure has changed following the catastrophe. However, the information also includes other obstacles, such as contaminated areas, obstruction locations, and non-functioning traffic signals.

Figure 2:
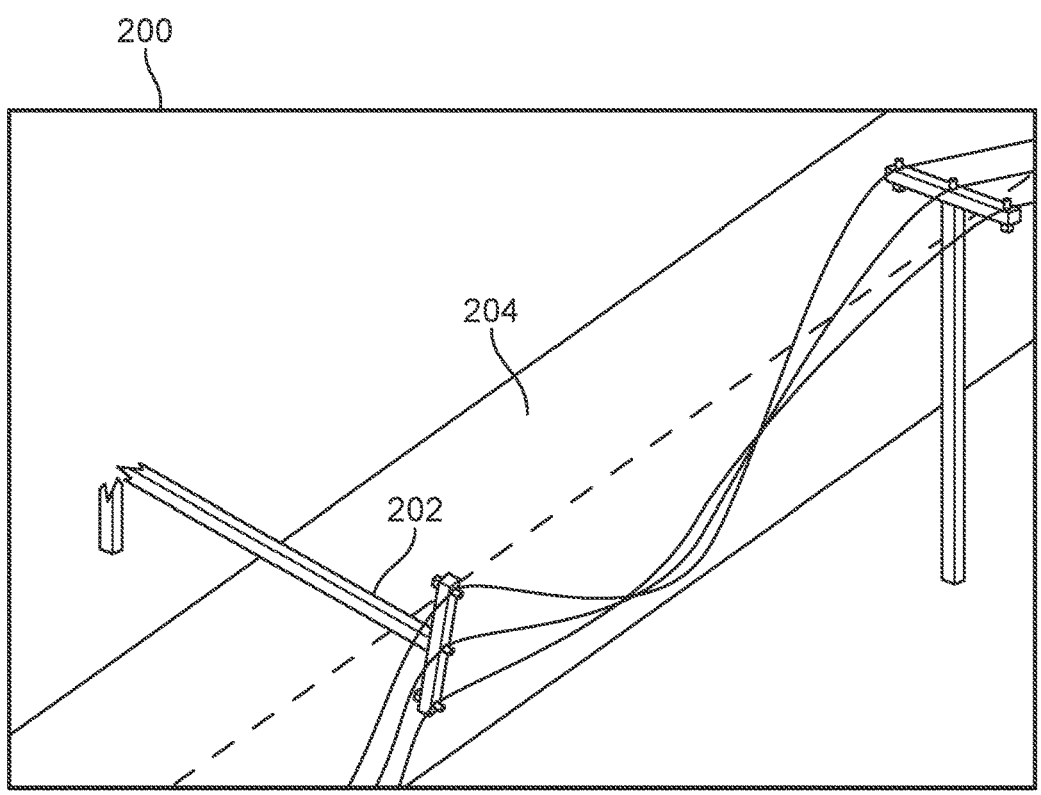
FIG. 2 shows a geographic area with a collapsed power line, according to an embodiment.

FIGS. 1-2 show examples of pictures of geographic areas with damaged infrastructure, according to embodiments. FIG. 1 shows a geographic area with a downed tree, according to an embodiment. FIG. 2 shows a geographic area with a collapsed power line, according to an embodiment.

For example, FIG. 1 shows an impeded road with a downed tree at scene 100. In the embodiment shown in FIG. 1, collapsed tree 102 blocks road 104. FIG. 2 shows an impeded road with a collapsed power line at scene 200. In the embodiment shown in FIG. 2, collapsed power line 202 blocks road 204. FIGS. 1-2 are examples of damaged infrastructure. The damage may require alternative routes when navigating these environments. In the embodiment shown in FIG. 1, a user may need to go around the tree. In the embodiment shown in FIG. 2, a user may need to choose an alternative route to avoid the collapsed power line.

The blockage to these types of infrastructure may be caused by various natural or man-made causes. For example, a tree may collapse due to various weather effects. Weather effects may include flooding, wind, tornadoes, hurricanes, being struck by lightning, and so on. However, other natural causes may affect infrastructure, such as earthquakes, wildfires, and so on. Damage to infrastructure may also result from man-made causes. Man-made causes may be deliberate or accidental. Deliberate causes involve intentional actions that adversely affect infrastructure. For example, a power line may collapse due to a terrorist action or a military strike. In such a situation, disrupting infrastructure is an intentional goal.

However, a tree may fall over when struck by a vehicle, which may occur due to an accident, or an incident such as a collision by an intoxicated driver. Here, the destruction is generally accidental. Thus, a number of causes may lead to the collapsed tree. Regardless of the cause, the tree is an obstacle.

The collapsed tree of FIG. 1 and the damaged bridge of FIG. 2 are only non-limiting examples of damaged infrastructure. An aspect of damaged infrastructure is that the damaged infrastructure may changes how a user navigates the area with damaged infrastructure. The damage may block routes, or may create areas that are impassable because of dangerous elements.

For example, a collapsed tree as in the embodiment of FIG. 1 may make it difficult to cross the area that it blocks. A collapsed tree may also lead to a downed electrical wire as in the embodiment of FIG. 2. It then becomes important to leave sufficient distance from the wire. Otherwise, a user could be electrocuted, or a user's vehicle could be endangered. Embodiments may manage the dangerous aspects of hazards based on a type of vehicle of the user. For example, a bicyclist may be in greater danger from a downed wire than a driver of a military tank. However, the bicyclist may be able to use narrower detours than the military tank.

Such environments may provide for alternative routes that involve manipulating the environment. For example, a user may take actions to move a collapsed tree out of the way. The user may pick up the tree and move the tree. Alternatively, the user may cut the collapsed tree into pieces and move the pieces. However, it may be impractical or dangerous to ascertain these alternative navigational approaches in real time and during actual use at a dangerous location. Embodiments use a simulation to predict safe, effective ways to deal with damaged infrastructure prior to actually navigating the infrastructure.

A driver may apply the predictions during actual use. The simulation allows users to experiment with ways to navigate the damaged areas. The experimentation identifies routes with desirable aspects like safety, simplicity, and minimized time and/or distance requirements.

Figure 3:
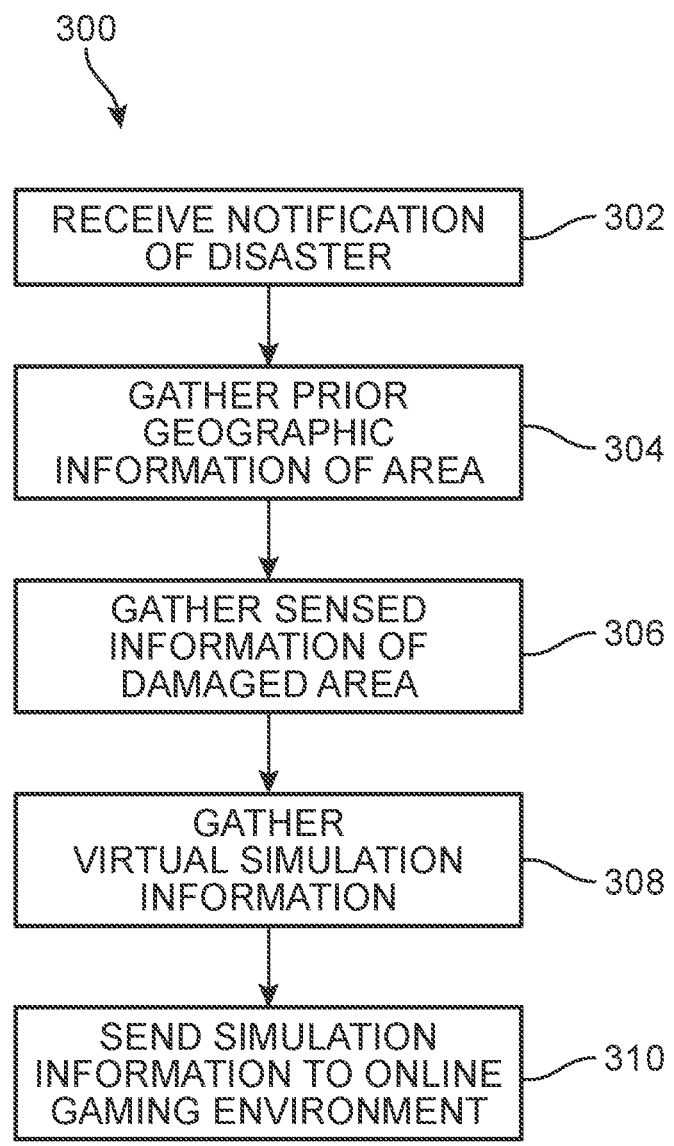
FIG. 3 is a flowchart showing a process of generating a virtual area corresponding to a geographic area with damaged infrastructure and sending the virtual area for use in an online gaming environment, according to an embodiment.
Figure 4:
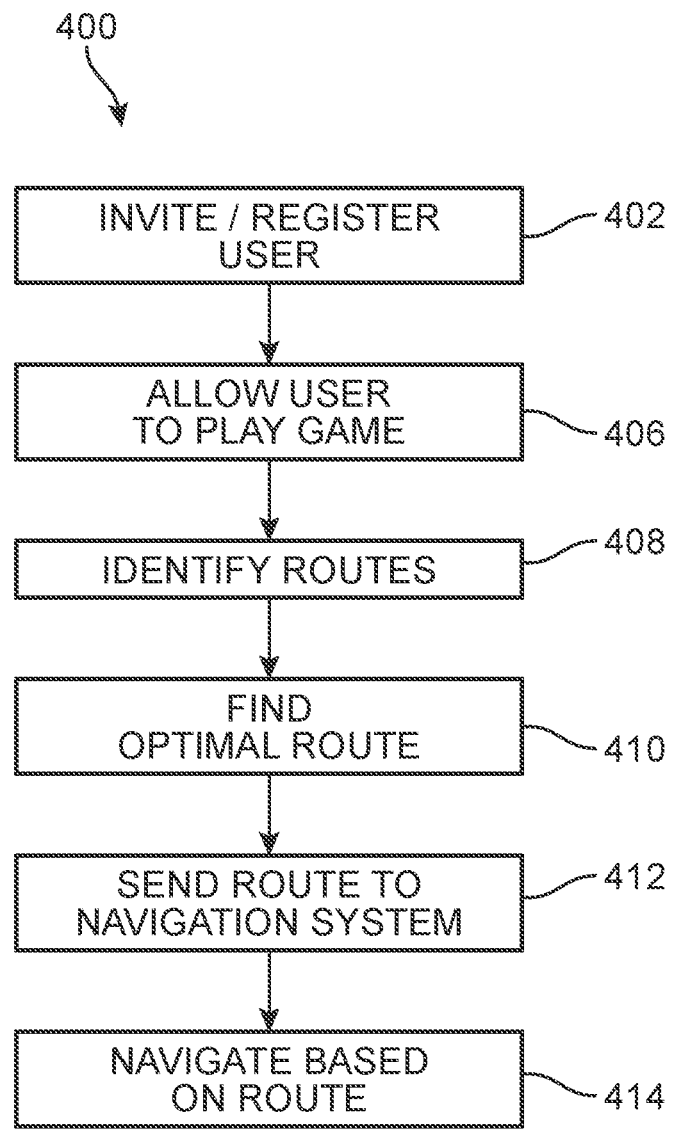
FIG. 4 is a flowchart showing a process of finding optimal routes based on gameplay in the online gaming environment, used for navigation purposes, according to an embodiment.

FIG. 3 is a flowchart showing a process of generating a virtual area corresponding to a geographic area with damaged infrastructure and sending the virtual area for use in an online gaming environment, according to an embodiment, at generating method 300. FIG. 4 is a flowchart showing a process of finding optimal routes based on gameplay in the online gaming environment, used for navigation purposes, according to an embodiment, at simulation method 400.

FIG. 3 illustrates initial steps involved in generating a simulation. In particular, FIG. 3 illustrates gathering relevant data. Some steps may be combined and/or omitted; other steps are possible. To create a simulation environment, an embodiment uses accurate pictures of the area to be simulated. The embodiment also employs information about objects in the area for simulation. This initial method is generating method 300 in FIG. 3.

In step 302, the system receives a notification of a disaster. For example, a user or a connected system may send a message notifying the system of a disaster. The message may be a specialized alert indicating a disaster. Other messages may also alert the system of a disaster, such as an e-mail, a dedicated text message, and so on. Alternatively, the system may become aware of an event through a published message, such as by monitoring a newsfeed and receiving an appropriate news story.

In step 304, the system gathers prior geographic information of an area. Here, "prior" geographic information refers to geographic information corresponding to an area in a typical state. The prior information shows the area before the disaster occurred. For example, the geographic information gathered here may be similar to geographic information gathered in step 306, as discussed further below. The imagery comes from various sources and sensors, but the information gathered here shows a baseline of the geographic area.

For example, the information may include information about routes and utilities. The information may be a picture of a road before a storm has knocked a tree over, or a bridge before it collapses. Having this information allows the system to establish basic aspects of the geographic area. These basic aspects clarify what has changed based on the disaster. When performing this step, it is preferred to use "usual" geographic area that is most relevant to the simulation.

For example, some geographic areas may have aspects that change based on other cyclic events or patterns of land use. Examples include which season, which portion of the week, or a time of day. For example, it may make sense for embodiments to use past information with respect to a damaged road or bridge on a weekday if the damage occurs on a weekday. As other examples, embodiments use past information from the summer if the damage occurs during the summer, or at twilight if the damage occurs during twilight.

In step 306, the system gathers sensed information of a damaged area. For example, various sensors such as cameras in various positions gather information about the damaged area. The information indicates what has changed due to the occurrence of the disaster.

In step 308, the system gathers virtual simulation information. For example, the virtual simulation includes information about the geographic area, such as its layout, where obstacles are located, and arrangement of routes permitting navigation of the geographic area. Details provided below elaborate on aspects of such a virtual simulation.

In step 310, the system sends the simulation information to a gaming environment. The gaming environment is a host or other provider allowing users to use the simulation. For example, the user accesses the gaming environment locally or over a network connection. If the user accesses the gaming environment locally, access may be provided through a local wired network, a local wireless network, or a combination of such networks. The user may access the gaming environment through a larger or a remote network, such as the Internet, or another wide area network (WAN) or cloud network. The gaming environment allows the users to interact with a simulation of a geographic area affected by a disaster, in the context of a game.

The simulation information allows the gaming environment to create a game that simulates the area affected by the disaster. The simulated interaction corresponds to an actual interaction. Accordingly, embodiments record the events involved in a simulated interaction. Such recorded events are useful to develop a strategy with respect to how to navigate the area in real life.

FIG. 4 illustrates how the simulation is used and applied, in an embodiment with one user. This simulation method is simulation method 400 in the embodiment of FIG. 4. However, in other embodiments, multiple users interact with the simulation. Further aspects of multiple users are described in further detail, below.

In step 402, the online gaming system invites the user to play the game, and may also register the user. For example, this interaction may involve establishing an account for the user that involves establishing login credentials. Login credentials may include identifying credentials and authenticating credentials. Identifying credentials establish who the user is and authenticating credentials confirm the user's legitimacy.

The login credentials may involve a username and password, as examples. Other types of login credentials such as a personal identification number (PIN), biometric identification, two-factor authentication, and so on may be used at login. Use of credentials allows the user to play the game while preserving the integrity of the game and the user's privacy and security.

For example, the authentication may help ensure that only users who genuinely want to play the game in a helpful manner to participate. The authentication blocks malicious actors. Such malicious actors might deliberately play the game in a way that generates unhelpful or corrupt gameplay data. The authentication may also protect user privacy. Otherwise, malicious actors might extract identifying information or other detrimental information about valid users.

Also, in step 402, the system allows a user to define an avatar representing his or her presence in the simulated world. For example, the avatar may be a human character or a humanoid character. The avatar is preferably a vehicle operated by a human character or a humanoid character, such as a bicycle, an automobile, a motorcycle, a truck, and so on. However, these are only examples of vehicles and vehicles can include essentially any vehicle, such as military vehicles, commercial vehicles, etc.

In step 406, the system allows a user to play a game. This step is discussed further below. In general, the user controls the avatar (such as a vehicle) to experiment with navigating through the geographic area, finding ways to manage obstacles.

In step 408, the system identifies routes through the geographic environment. For example, the system tracks user behaviors and observes results. This step allows the system to track user route-finding over time. The system takes advantage of the user's ability to use judgment to find ways to effectively navigate in the simulation.

In step 410, the system finds optimal routes through the geographic area. Various criteria may apply with respect to what constitutes "optimal." An optimal route may be based on time, distance, avoiding dangers, or other appropriate metrics. The metrics lead a user to find a certain route or combination of routes as being a route with helpful qualities.

In step 412, the system sends one or more optimal routes to a navigational system. For example, an optimal route may be represented by a path on a map, or by a series of steps a user should take to follow an optimal route when navigating the geographic area. Examples of step 412 are presented in greater detail, below.

In step 414, the system allows the user to navigate based on the route. For example, the system may send information to a geographic information system (GIS). The GIS may provide a map or directions to allow an actual user to navigate the environment, either in a vehicle or otherwise. The user may follow the optimal route and effectively maneuver around and interact with the disaster area based on the route. Thus, the user receives the route from the system and uses the route as a navigational aid.

In one embodiment, a human user implements the determined route by following directions that he or she uses when walking around the disaster area or operating a vehicle to navigate the disaster area. In another embodiment, an autonomous vehicle may follow the determined route. An autonomous vehicle may operate entirely autonomously or may operate partially autonomously, with some corrections by a human operator. Using humans for training and machines for actual navigation is advantageous. One or more humans may be able to establish how a vehicle can navigate an area using human intelligence and learning. Then, the vehicle can practically apply the synthetically created navigation data produced by the humans during the simulation.

Figure 5:
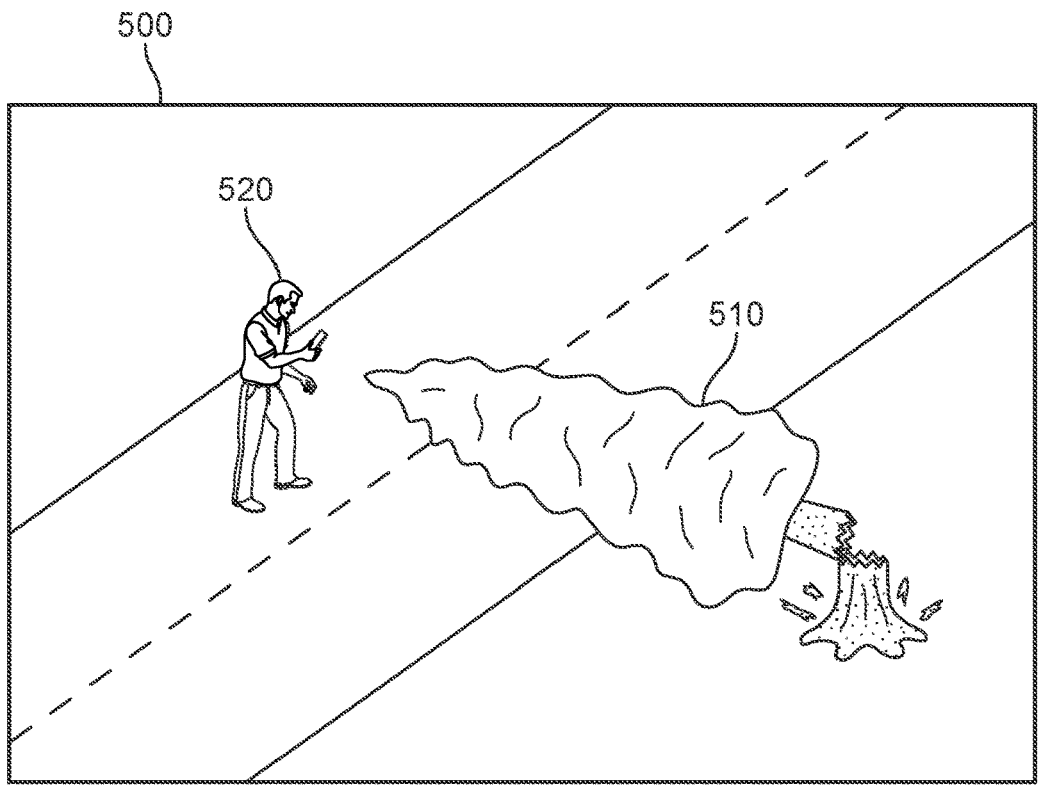
FIG. 5 shows data gathering with respect to a geographic area with damaged infrastructure by a person with a mobile device, according to an embodiment.
Figure 6:
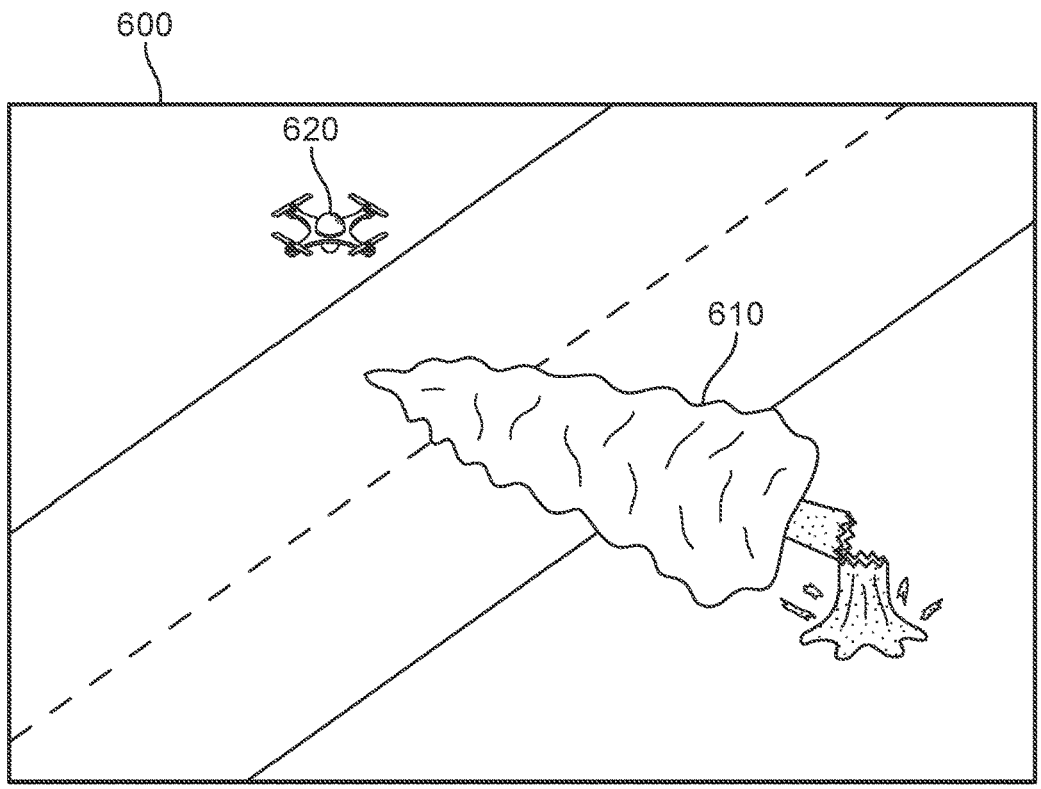
FIG. 6 shows data gathering with respect to a geographic area with damaged infrastructure by a drone, according to an embodiment.
Figure 7:
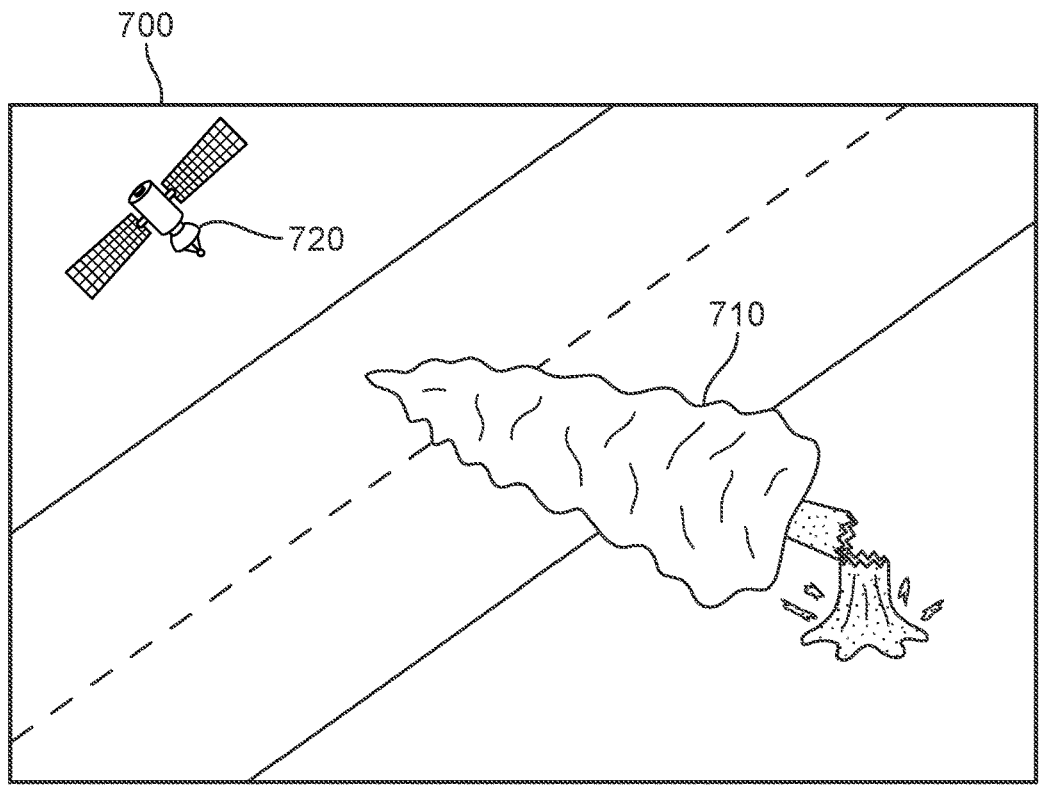
FIG. 7 shows data gathering with respect to a geographic area with damaged infrastructure by a satellite, according to an embodiment.

FIGS. 5-7 are example pictures of data gathering with respect to a geographic area with damaged infrastructure. Various types of devices gather information about the area, using various sensors (visual, thermal, radar, infrared, etc.). Existing information (maps, previous imagery, sensors, etc.) may supplement the gathered information.

FIG. 5 shows data gathering with respect to a geographic area with damaged infrastructure, according to an embodiment, at data gathering image 500, specifically data gathered by a person with a mobile device 520. FIG. 5 is an example of data gathering from a ground level source. For example, a ground level observer may be a mobile ground level observer or a static ground level observer.

FIG. 6 shows data gathering with respect to a geographic area with damaged infrastructure, according to an embodiment, at data gathering image 600, specifically data gathered by an overhead source. The overhead source may be manned or unmanned, such as drone 620. FIG. 6 is an example of data gathering from an overhead source in the sky. For example, FIG. 6 illustrates a drone 620 that uses sensors such as cameras to take overhead pictures of the affected geographic area.

When taking photographs, the photographs may be photographs that capture the whole area, or a series of photographs or a mosaic of photographs that are compiled together. Such a drone 620 may obtain images of or other sensed information of damaged infrastructure, such as downed tree 610.

FIG. 7 shows data gathering with respect to a geographic area with damaged infrastructure, according to an embodiment, at data gathering image 700, specifically data gathered by a source in outer space, such as satellite 720. FIG. 7 is an example of data gathering from a source in outer space. As noted above, the photographs may be photographs that capture the whole area, or a series of photographs or a mosaic of photographs that are compiled together to obtain more details of the geographic area.

Figure 8:
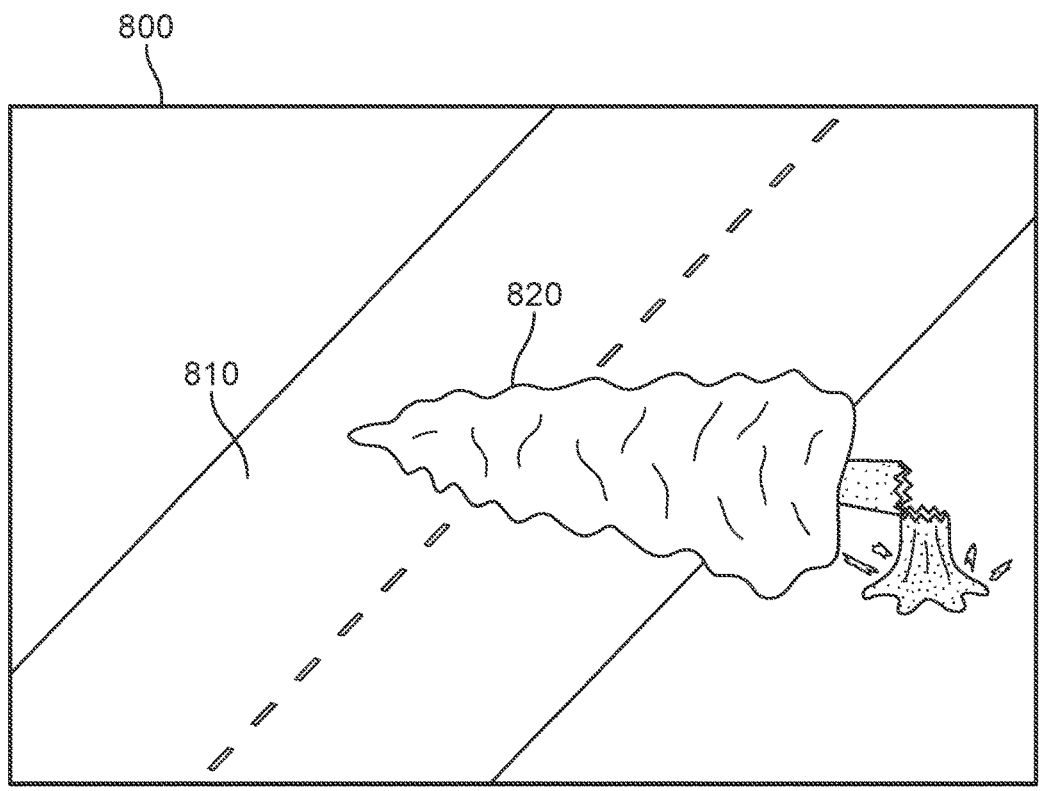
FIG. 8 shows a virtual area from an overhead perspective, according to an embodiment.

FIG. 8 shows a virtual area from an overhead perspective, according to an embodiment, at virtual image 800. The embodiments gather the information gathered as shown in FIGS. 5-7. The embodiments may supplement the information, such as with pre-existing data. Based on the supplemented information, the embodiments construct pictures of a virtual area for a simulation. The embodiments then present the simulation as a game, such as detailed further, below.

In general, the embodiments use a two-dimensional video monitor, possibly supplemented with audio feedback. Embodiments may also use other information to help allow users interact with the simulation and provide actions that are useful with respect to a model of the real world.

For example, FIG. 8 shows virtual image 800 from a perspective above the affected area. Thus, FIG. 8 is an example picture of a virtual area from an overhead perspective. The area illustrated in FIG. 8 is a simple example of a scenario with damaged infrastructure. In FIG. 8, the drawing shows a view of a use case where there is a two-lane highway 810, and a tree 820 has fallen over. The tree 820 blocks the highway 810. In FIG. 8, the drawing shows that a top portion of the tree 820, such as a leafy portion, also covers part of the highway 810.

Thus, a view such as that presented in FIG. 8 shows an entire scene. The overhead aspects provide additional information about how navigation between the two portions of the tree 810 might occur. For example, a user might try to navigate between the two pieces of the tree 820, over one piece or the other, or simply go around the tree 820.

An overhead view may be advantageous in that it allows a user to strategize by choosing a route that considers the whole scene. However, an overhead view may present issues in that it does not provide a realistic way for the user to interact with the environment. A user would typically use a first-person view when navigating through the dangerous environment.

Figure 9:
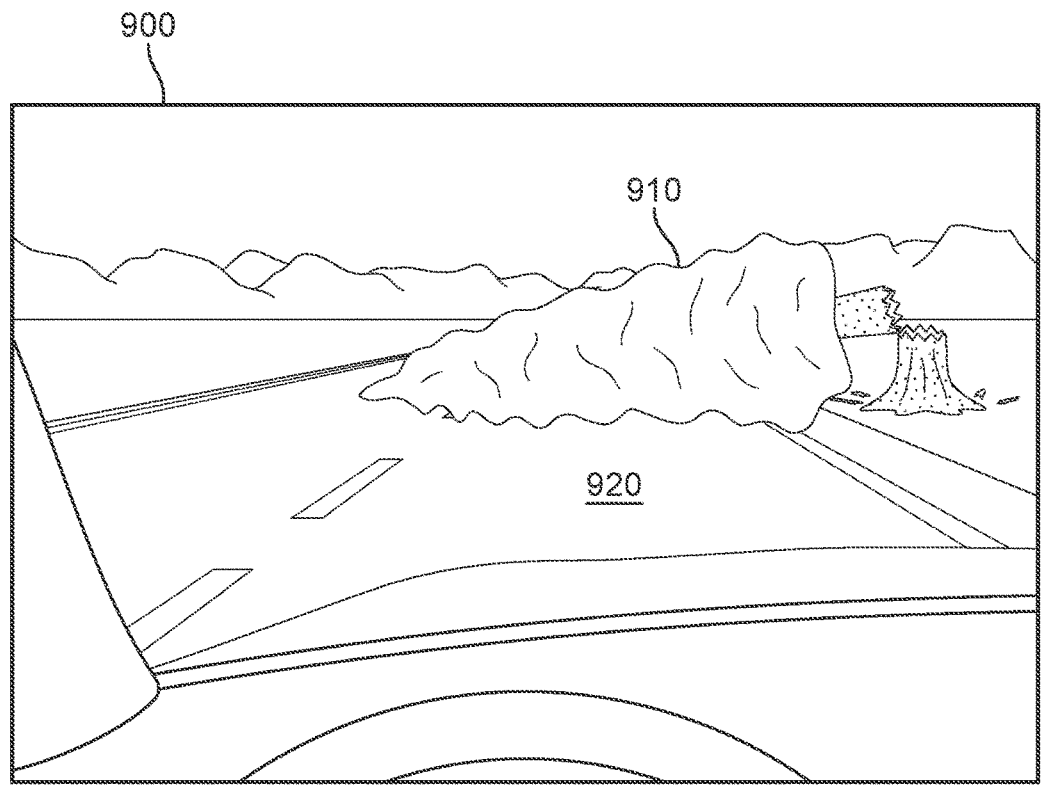
FIG. 9 shows an online game from a first-person perspective, according to an embodiment.
Figure 10:
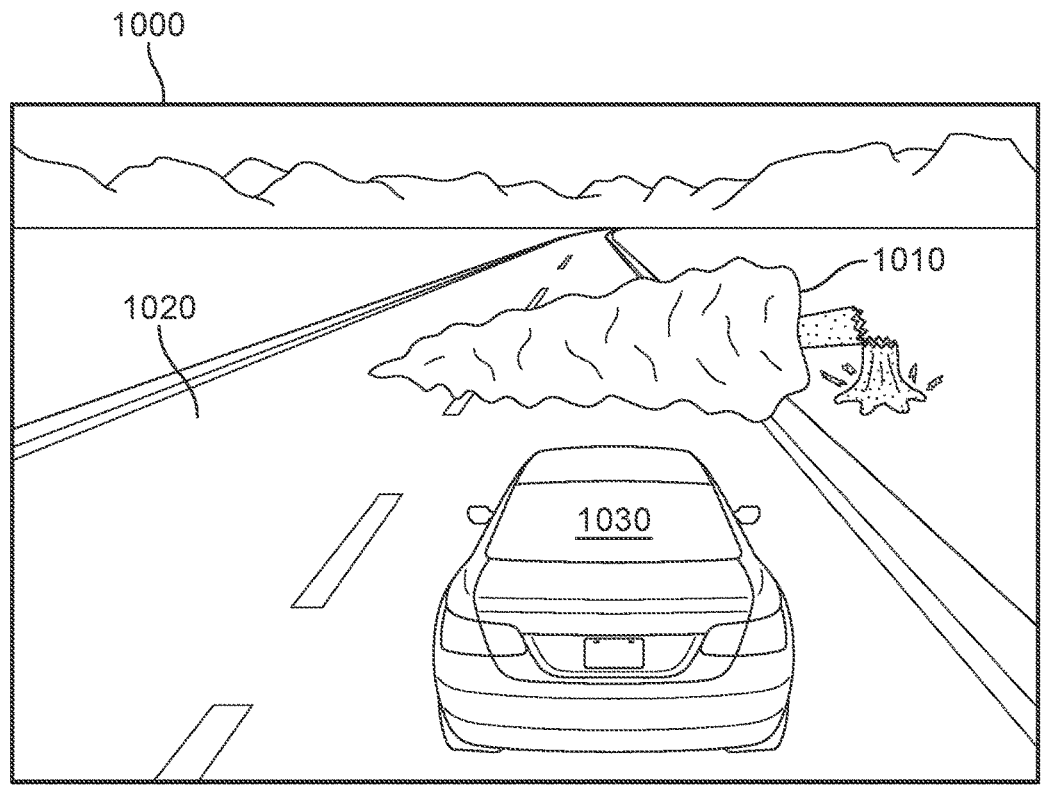
FIG. 10 shows an online game from a third-person perspective, according to an embodiment.

An example using a first-person perspective or a third-person perspective, such as that of the embodiments of FIGS. 9-10, may be a more useful way of providing an interactive game for the user. In particular, FIGS. 9-10 show a perspective of the virtual area from the ground. Such a perspective is similar to the way a user would actually choose how to navigate the environment. Therefore, FIGS. 9-10 may be useful because they will show the users a simulation of what they would actually see when navigating the area. These perspectives may provide a better representation of the choices a user has to make when navigating an affected geographic area.

FIG. 9 is an example picture of an online game from a first-person perspective, according to an embodiment, at first-person frame 900. For example, the first-person frame 900 is intended to replicate what a driver would see while navigating through an environment. FIG. 9 corresponds to the virtual environment shown in FIG. 8. For example, FIG. 9 shows a front-window of a vehicle a user drives, which provides the user with the ability to see, ahead, a downed tree 910 blocking a road 920.

FIG. 10 is an example picture of an online game from a third-person perspective, according to an embodiment, at third-person frame 1000. In FIG. 10, the user sees a representation of a vehicle 1030 he or she is driving, with the camera positioned immediately behind and above the vehicle 1030. The vehicle 1030 drives along a road 1020, which is also blocked by downed tree 1010.

The simulation may be purely a simulation. The simulation may also be an AR (augmented reality) simulation in which the user or another agent actually interacts with the damaged infrastructure during the simulation. For example, a user may direct a robot to navigate the environment or a mock-up of the environment. Then, the simulation may have a real-life component and not be solely virtual in nature. Even if the simulation is virtual, its results can be practically applied.

As noted, FIG. 9 is an example depiction of an online game from a first-person perspective. In the embodiment of FIG. 9, the game illustrates the geographic area as if from a user's eyes. This perspective may be valuable because it gives a user the best chance to make choices and interact with the geographical environment as if he or she was actually navigating through the geographical environment.

Also as noted, FIG. 10 is an example depiction of an online game from a third-person perspective. In such an approach, the game illustrates the geographic area as if from behind the user. Thus, the camera may see the form of a walking user, or the form of a vehicle operated by the user. The view is otherwise somewhat similar to a first-person perspective. As in FIG. 9, FIG. 10 provides a way for the user to interact with the virtual environment that is akin to what he or she would experience if directly interacting with the environment being simulated.

While not illustrated, an online gaming environment may provide other ways for users to interact with the online game. For example, a user may play an online game from a top-down perspective. Such an approach allows a user to have an overall sense of what is present in an environment with damaged infrastructure. Having such an overall sense may allow a user to have a better understanding of the totality of the factors limiting motion in an affected environment. However, the top-down view does not capture three dimensional aspects of the environment for the user's consideration. For example, a user may see a downed branch from a top-down view. The user may not realize that the downed branch includes an elevated portion that a user may cross underneath as a navigational option.

As another example, a user may play an online game from an isometric perspective. An isometric perspective is similar to a top-down perspective, but is angled slightly to also depict certain three-dimensional aspects of a simulation. Therefore, an isometric perspective may be a good choice for the simulation. The isometric perspective allows a user to see an entire scene, but the angling allows a user to have some knowledge of three-dimension aspects of the scene.

As yet another example, a user may play an online game from a flat, side-view perspective. Such a perspective is not usually well-suited to an environmental simulation as described herein. A side-view perspective only shows a two-dimensional view as shown by a slice through the environment. However, it is a possible type of perspective, and may be used in examples where appropriate. A side-view may be helpful where a user follows a linear path through a region and the relevant issue is navigating obstacles having different heights.

As another example, a user may play an online game from a text-based perspective. The "perspective" in this example is not an actual picture, but is instead a textual description of the obstacles and environment provided by the virtual gaming environment. In this embodiment, the user enters textual commands to navigate the environment.

For example, the user may enter commands such as moving a certain distance, turning in different directions, interacting with obstacles, and so on. However, other examples may supplement the textual descriptions with other forms of information, such as pictures and sounds. The textual commands may also allow users to enter scripts or algorithms for navigating gaming environments.

As yet another example, a user may play an online game from a virtual reality (VR) perspective. The VR perspective of this example is not a distinct perspective. The VR perspective refers to a perspective provided by a VR headset or augmented reality (AR) glasses. Generally, the VR perspective will be first-person as in FIG. 9 or sometimes third-person as in FIG. 10, but the VR perspective is not limited to these embodiments. Also, a VR perspective may show stereoscopically generated images to each eye of a user, thereby simulating depth.

Figure 11:
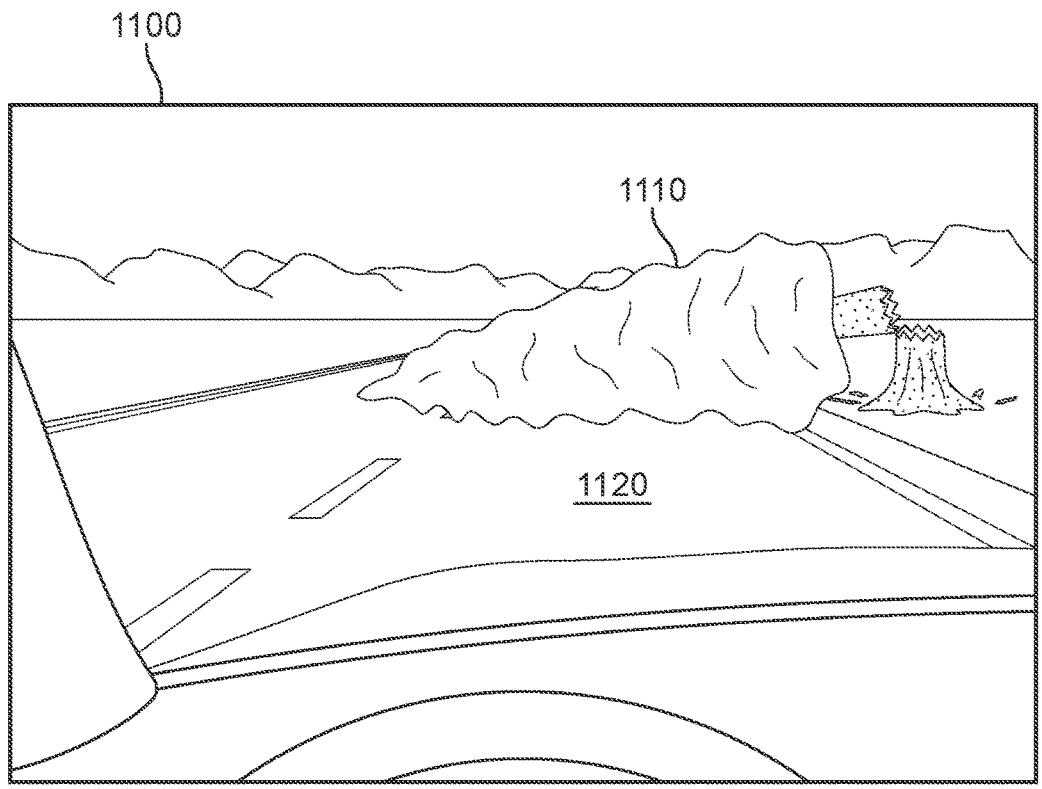
FIG. 11 shows a sample interaction from a first-person perspective, where there is a tree on a road ahead, according to an embodiment.

FIG. 11 shows a sample interaction from a first-person perspective, where there is a tree on a road ahead, according to an embodiment, at interaction image 1100. For example, the user sees a downed tree 1110 ahead on his or her path, if he or she remains in the right lane of highway 1120. The user may decide how best to avoid or otherwise get past the downed tree 1110 to continue on the highway.

Figure 12:
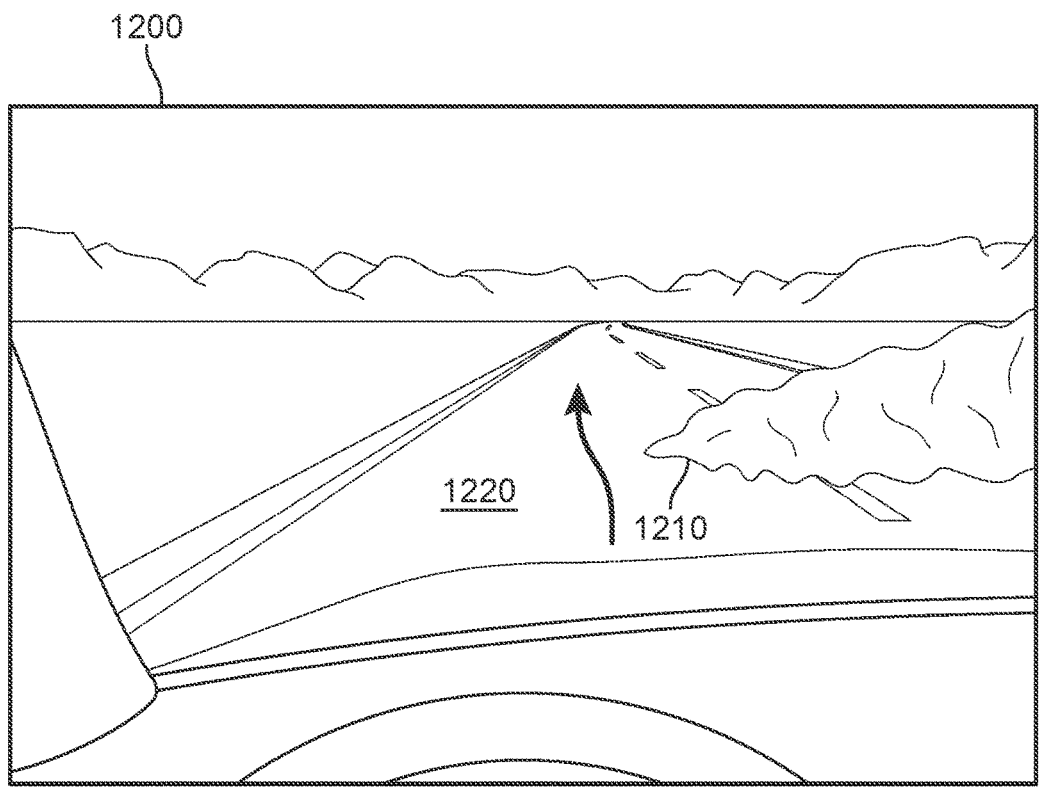
FIG. 12 shows a sample interaction from a first-person perspective, where there is a tree on a road and a vehicle goes around the tree, according to an embodiment.

FIG. 12 shows a sample interaction from a first-person perspective, where there is a tree on a road and a vehicle goes around the tree, according to an embodiment, at interaction image 1200. In FIG. 12, the user veers into the left lane 1220 of highway 1220, to circumvent tree 1210. Such an approach may be taken by a vehicle that cannot travel over the tree 1210, and instead the user should drive the vehicle to go around the tree 1210.

Figure 13:
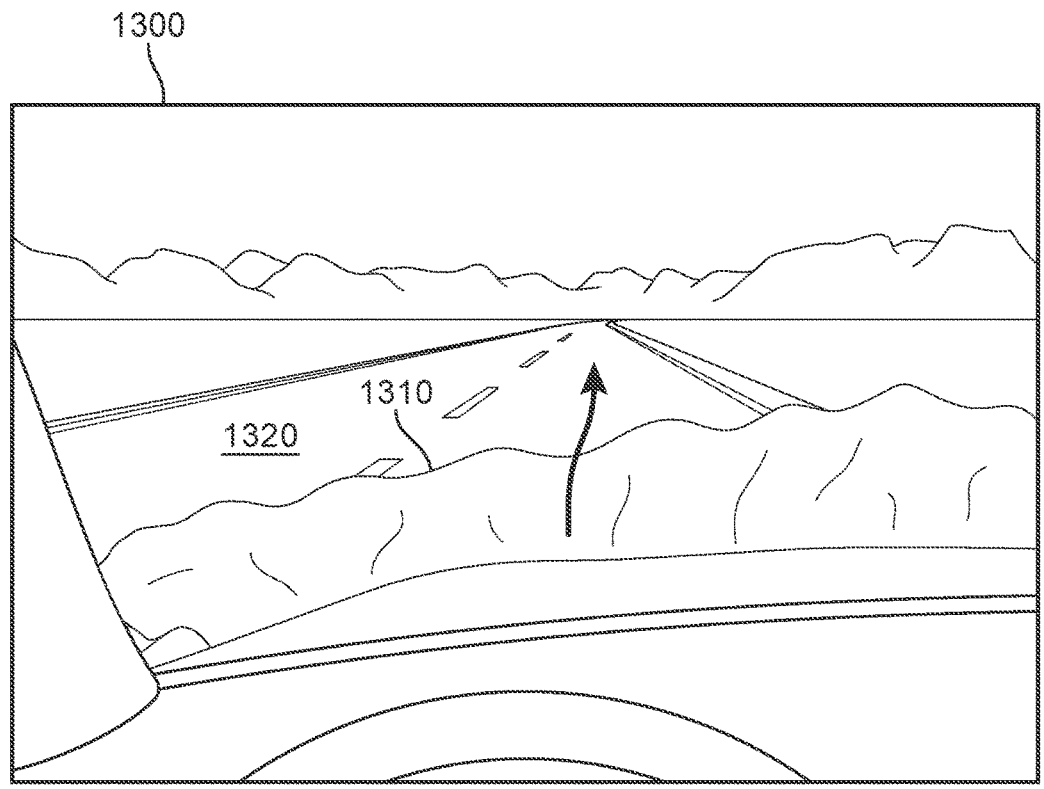
FIG. 13 shows a sample interaction from a first-person perspective, where there is a tree on a road and a vehicle goes over the tree, according to an embodiment.

FIG. 13 shows a sample interaction from a first-person perspective, where there is a tree on a road and a user drives the vehicle over the tree, according to an embodiment, at interaction image 1300. In FIG. 13, the user drives the vehicle over the tree 1310, which is collapsed on highway 1320. However, the option of traveling over tree 1310 may only be available to certain vehicles, such as vehicles with four-wheel drive.

Figure 14:
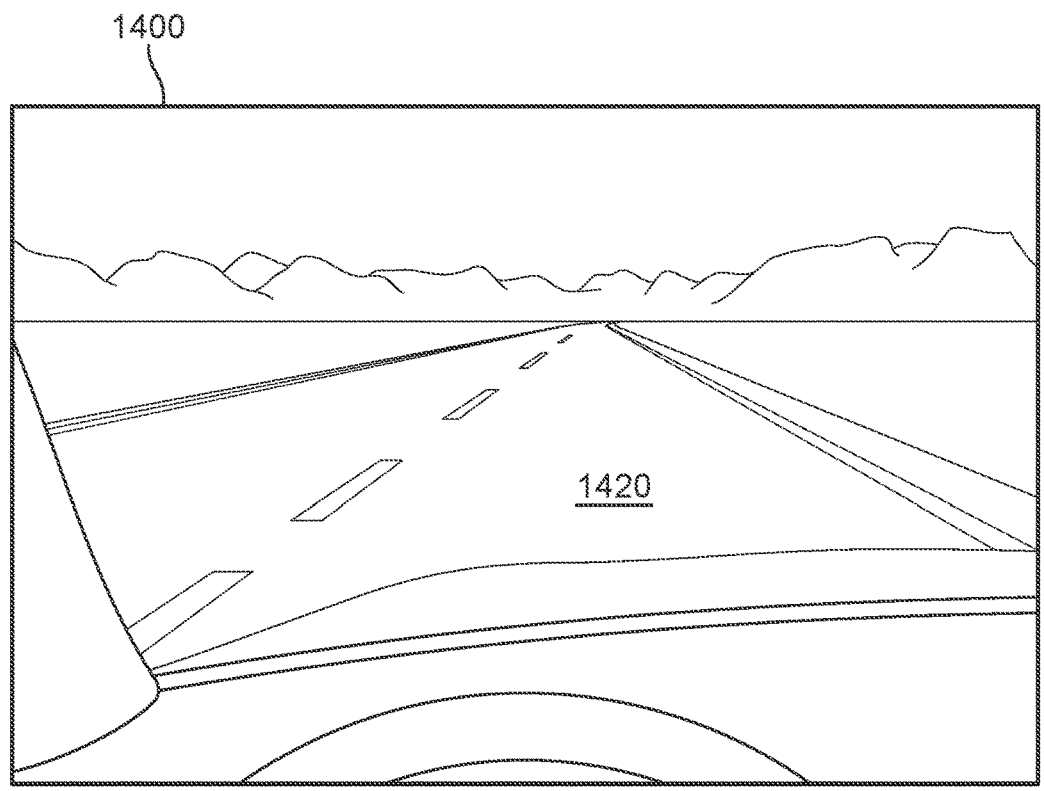
FIG. 14 shows a sample interaction from a first-person perspective, where there is a tree on a road and the vehicle is past the tree, according to an embodiment.

FIG. 14 shows a sample interaction from a first-person perspective, where there is a tree on a road and the vehicle is past the tree, according to an embodiment, at interaction image 1400. The user has passed the tree, so the user is back in the appropriate lane of highway 1420. Since the user has passed the tree, it is no longer visible to the user and the user may drive ahead unimpeded.

Figure 15:
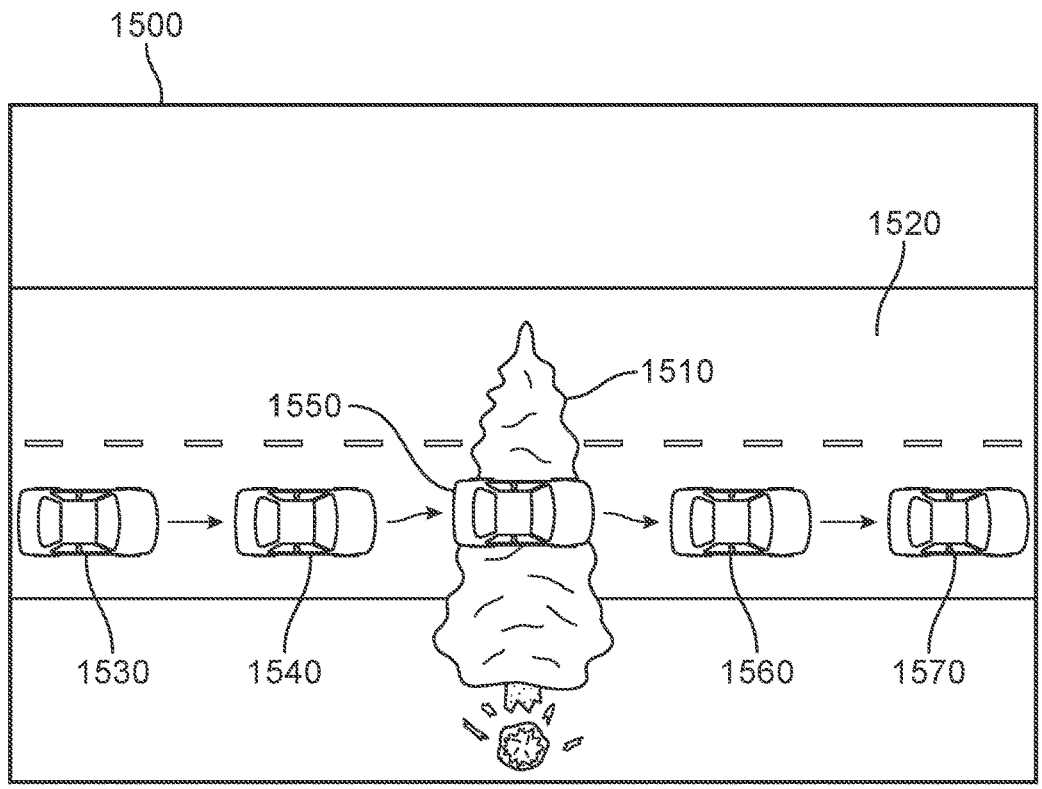
FIG. 15 shows a sample interaction from an overhead perspective, where a vehicle goes over a tree, according to an embodiment.

FIG. 15 shows a sample interaction from an overhead perspective, where a vehicle goes over a tree, according to an embodiment, at interaction image 1500. FIG. 15 is related to FIG. 13. In FIG. 15 there is a vehicle that travels on a highway 1520 with a downed tree 1510. For example, vehicle approaches tree 1510 at position 1530. At position 1540, the tree 1510 is directly ahead of the vehicle. The user must decide what to do about tree 1510. In FIG. 15, the user chooses to have the vehicle travel over tree 1510 at position 1550. Then, the user continues in the right lane at position 1560, and finally continues along the unobstructed road at position 1570.

Figure 16:
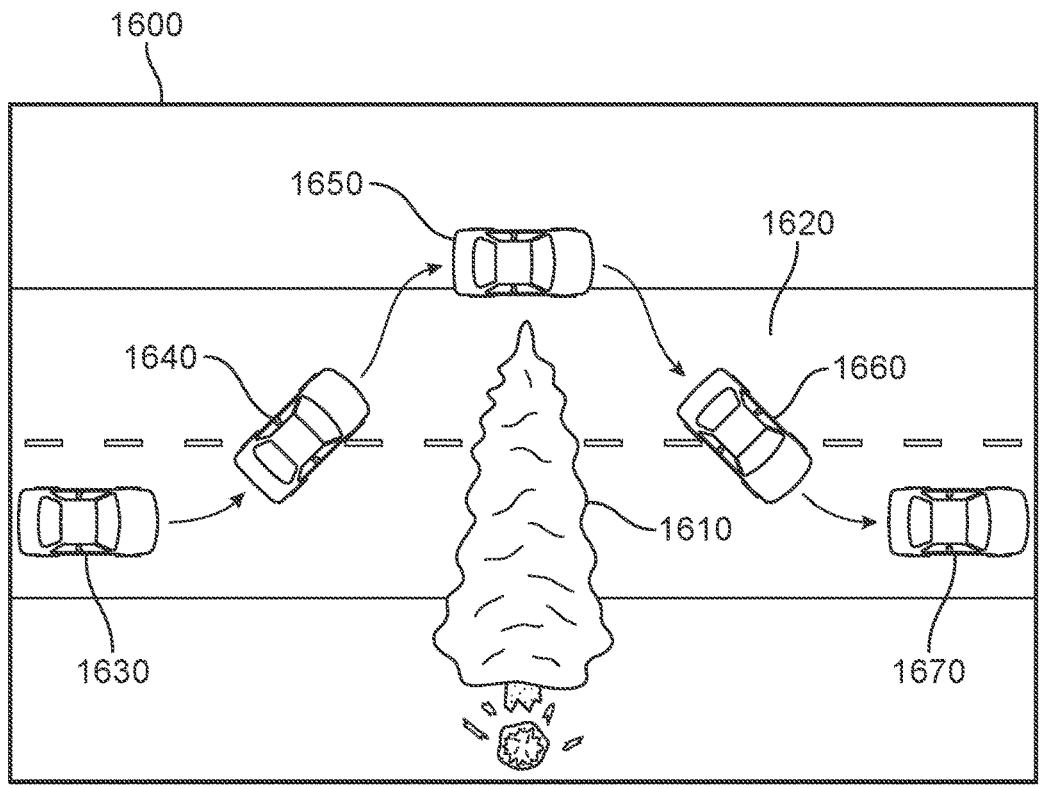
FIG. 16 shows a sample interaction from an overhead perspective, where a vehicle goes around a tree, according to an embodiment.

FIG. 16 shows a sample interaction from an overhead perspective, where a vehicle goes around a tree, according to an embodiment, at interaction image 1600. FIG. 16 is related to FIG. 12. In FIG. 16, there is a vehicle that travels on a highway 1620 with a downed tree 1610. For example, the user drives the vehicle and approaches tree 1610 at position 1630.

However, rather than travel over tree 1610, the user decides to veer around the tree 1610. At position 1640, the user goes off-road into the shoulder 1650 to avoid tree 1610. In FIG. 16, the user chooses to have the vehicle pass around tree 1610 at position 1650, continues from the left lane back into the right lane at position 1660, and continues along the unobstructed road at position 1670.

Thus, FIGS. 11-16 illustrate how the user plays an online game. As the user interacts with the online game, the online game records user action to allow learning, in the context of a user perspective. As discussed above, the user perspective may be first-person, third-person, overhead, or isometric depending on the example. For example, FIGS. 11-14 show what the user sees. The system may track his or her movement from above at FIGS. 15-16. For example, the user sees a route, blocked by an obstacle. In the present examples, the route is a road, and the obstacle is a downed tree.

The user may move an avatar of his or her vehicle around to avoid the tree in various ways. For example, the user may maneuver through a gap between pieces of the tree. Alternatively, the user may walk or drive over the tree, or may drive around the tree. However, a downed tree is only one example of an obstacle that a user may encounter. In general, obstacles may act as obstacles for at least one of three reasons. First, obstacles may physically bar a user's ability to move through an affected area (e.g., fallen power line). Second, obstacles may make it dangerous for a user to move through an affected area (e.g., chemical spill). Finally, obstacles may deprive the user of a way to move that would ordinarily be present (e.g., collapsed bridge).

Figure 27:
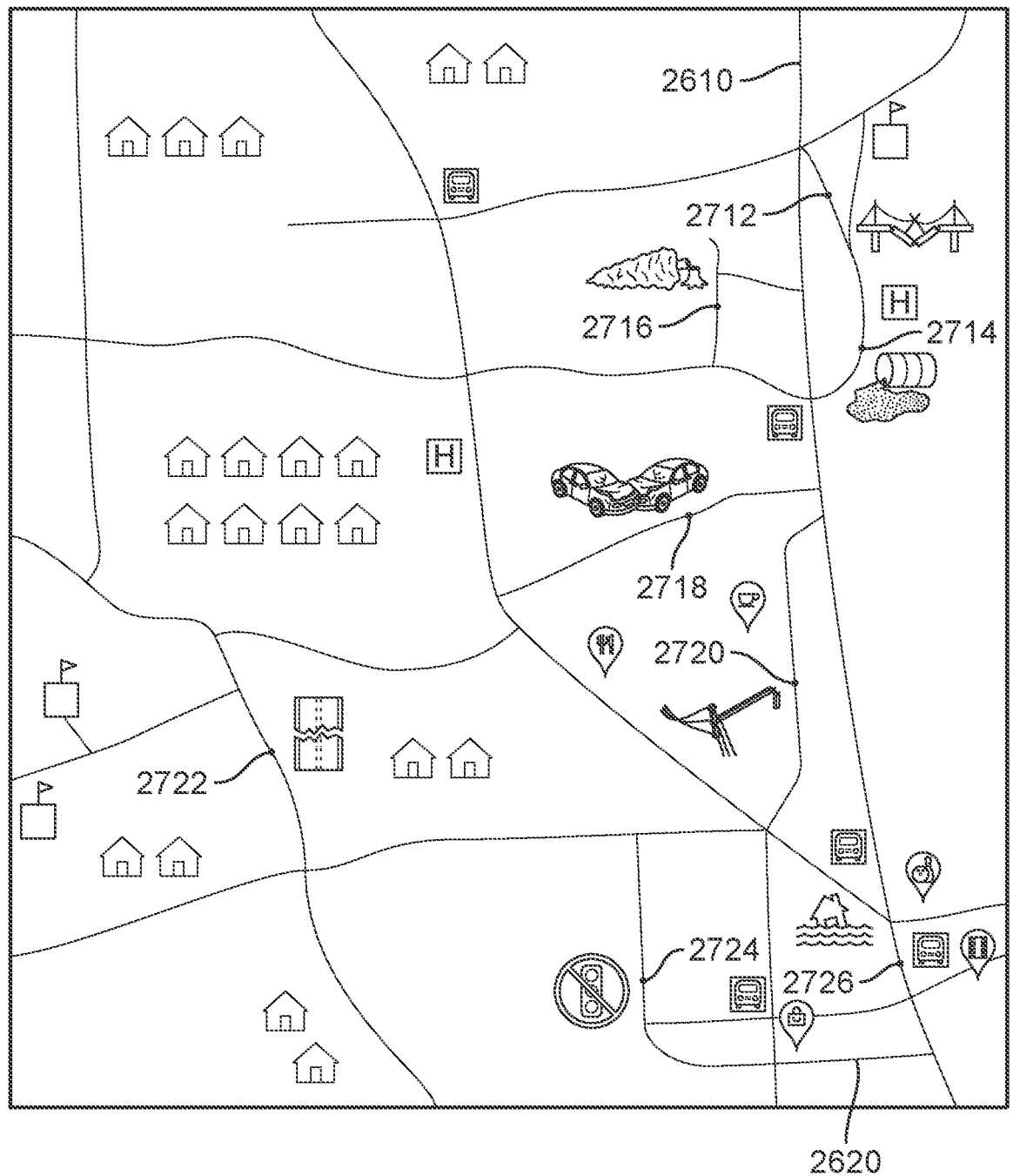
FIG. 27 is a map of the area of FIG. 26 after a disaster, with specific obstacles marked, according to an embodiment.
Figure 28:
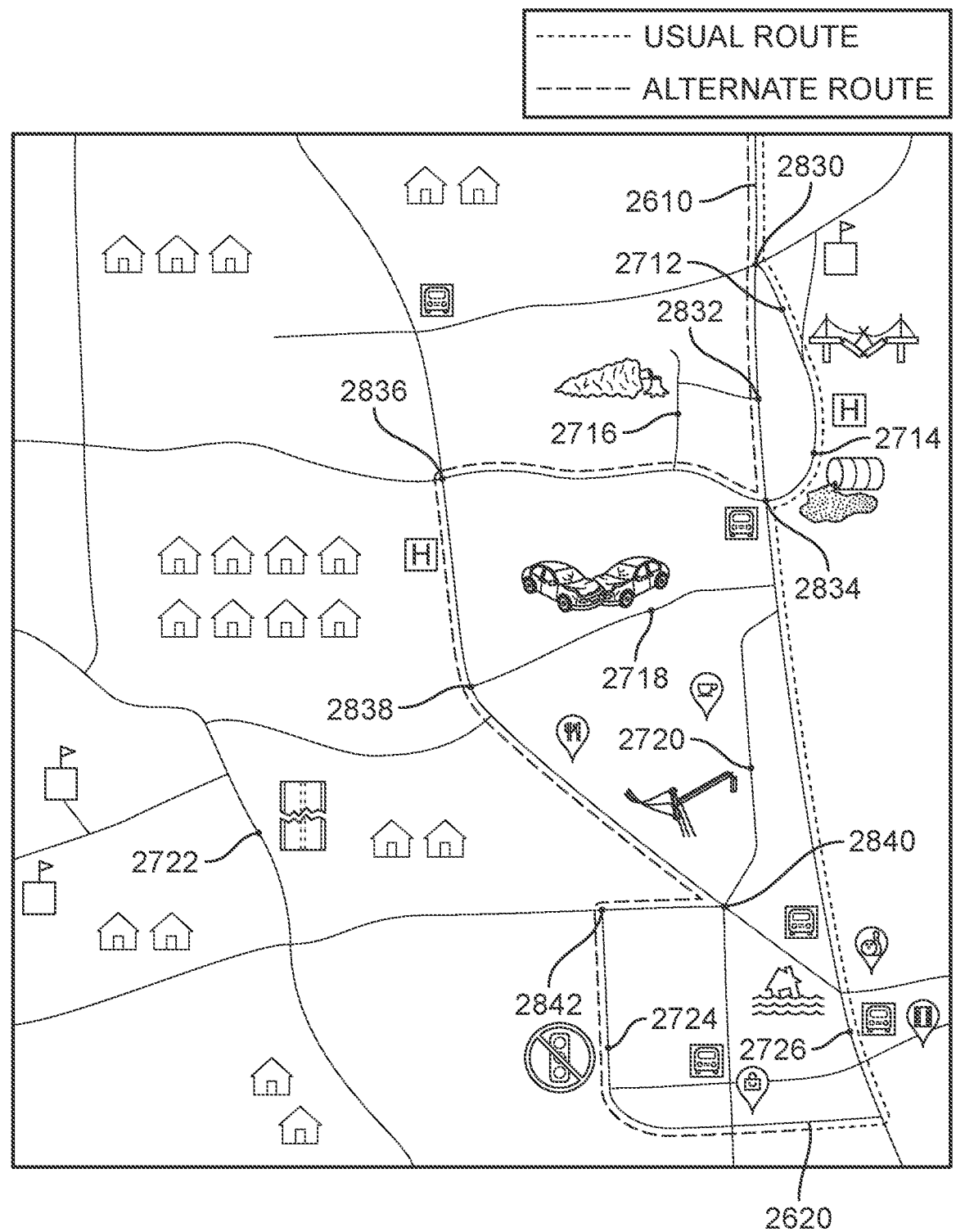
FIG. 28 is a map of the area of FIG. 27 after a disaster, with an original route and an alternative route marked based on the obstacles, the alternative route being acquired by user interaction with a simulation, according to an embodiment.

For example, a downed tree may physically bar a user's movement or a downed power line may make an area dangerous, as shown in FIGS. 1-2. and a collapsed bridge may deprive the user of a way to move that would ordinarily be present, as shown in FIGS. 27-28. Sometimes, an obstacle may be an obstacle for multiple reasons. For example, a toxic waste spill may make an area dangerous as well as physically impassable, as shown in FIGS. 27-28.

Another aspect of the simulation may include the ability to represent in real time environmental conditions that may occur as the user plays the game that affect the user's navigation of the environment. For example, extreme weather conditions such as rain or snow may affect the user's navigation. Rain and snow are only examples, and weather conditions are not limited to precipitation, but may also include extreme temperatures, high winds, and lightning, as other examples.

In some embodiments, it may be helpful for the simulation to take into account weather conditions for several reasons. First, some weather conditions may affect infrastructure, in that lightning or winds may knock over a power line or a storm may damage a road or a bridge. Second, weather conditions may affect how the user drives on a section of road. For example, ice or water on a road may make the road slick and affect driving on the road. Third, weather conditions may affect vehicle operation. For example, extreme heat may cause a vehicle to overheat, or precipitation may affect visibility.

FIGS. 15-16 illustrate the operation of an online game as the user interacts with the online game to allow learning. FIGS. 15-16 use a top-down perspective. The user's avatar representing the vehicle is part of an overhead illustration of the gaming environment. In this view, the user does not experience the simulation as if he or she was actually immersed in the environment. However, a top-down perspective may facilitate tracking the route a user follows as he or she interacts with the simulation and experiments with possible routes.

As shown in FIGS. 11-14 and FIGS. 15-16, a gaming environment lets user move around in a simulated environment, avoiding obstacles and dangerous situations. A user's movement is tracked, establishing possible routes in the simulation. The user has goals, such as traveling from a starting point to a destination point. After a user navigates through an environment repeatedly or multiple users navigate through a virtual environment, the system may compile data about the navigation of the user. The data allows the system to identify preferred routes.

The user may also desire to include intermediate points in the route. For example, the user may begin at a point on a road, travel to a point on the road past a downed tree, and then wish to travel to a subsequent point on another side of a damaged tree.

The user may also wish to interact with the environment (remove an obstacle, retrieve an article, remedy a dangerous situation, etc.). The user may also change operational aspects and/or settings of a simulated vehicle that he or she operates. For example, such operational aspects may be a transmission setting, or activation of a safety feature. For example, a user may change a gear setting of an automobile, or may engage four-wheel drive features of a truck to enable the vehicle to travel an obstacle. These setting are merely examples and should not be taken as limiting, as other aspects are present in other embodiments that change vehicle settings to overcome, destroy, or otherwise manage obstacles. The user may also utilize effectors, such as if a vehicle includes machinery that affects obstacles. For example, a vehicle may include a scoop that can move a branch out of the path of the vehicle.

A route may be considered optimal or not for various reasons. For example, a route may be a shortest, fastest, safest, cheapest, or easiest route. However, these are only non-limiting examples, and other criteria or combination of criteria may affect whether a given route should be considered optimal.

In the context of a first-person perspective as shown in FIG. 9 at first-person frame 900 or a third-person perspective as shown in FIG. 10 at third-person frame 1000, the user either sees what he or she would see if navigating himself or herself or over his or her shoulder, such as directly behind a vehicle. The user may move through and interact with the environment accordingly. For example, the user may move forward or backwards, turn, and look around. Some vehicles may be adapted to strafe, by moving left and right without turning.

Thus, the game may operate like other games that have a first-person or third-person view. However, the game content is based on actual information associated with the affected area. Thus, data generated as the user plays the game has additional value because it corresponds to the real world.

In the context of a top-down perspective as shown at 1500 in FIG. 1500, similar factors may apply. Alternatively, an embodiment may use an isometric perspective. However, by using a top-down perspective or an isometric perspective, the user may have access to information about his or her avatar as well as the surroundings. The user may therefore be able to successfully identify routes or ways to interact with the environment that may not be apparent from a first-person or third-person view. In those views, the user may have limited access to additional information about his or her avatar's surroundings that would otherwise help him or her ascertain how to navigate the environment.

For example, a user may desire to safely navigate an area with a number of downed power lines. In a first-person or a third-person view, the user will only be able to use his or her perceptions of his or her immediate surroundings in the simulation to avoid the downed power lines. The user sees a downed powerline ahead and tries to ascertain alternative routes. Additionally, if a user has encountered an obstacle such as a downed power line during a previous gameplay session, the user may remember that the obstacle was present in the route ahead. The user may accordingly make decisions and follow routes in subsequent gameplay sessions based on anticipation of an obstacle being present at a given location.

However, with a top-down perspective or an isometric perspective, a user may realize that a route that initially appears indirect or inefficient is actually a better route, because of other information that the user perceives from a top-down or isometric perspective. As noted, other embodiments may use other viewpoints. For example, interaction may involve a textual prompt, in which a user receives a textual description of a disaster area. The user enters textual commands interacting with the environment. These interactions, however, are not preferred.

These alternative perspectives are not generally as effective in finding ways to successfully navigate damaged infrastructure. However, a text-based interface may allow a user to identify successful navigation approaches because it may allow the user to write a script that provides an algorithm that helps solve the navigation problem. For example, some navigation problems may correspond to well-known computer science problems, such as the traveling salesman problem, and a text-based interface that allows a user to instruct an agent with an algorithm or scripting may be a way to provide good solutions for the navigation problems.

Figure 17:
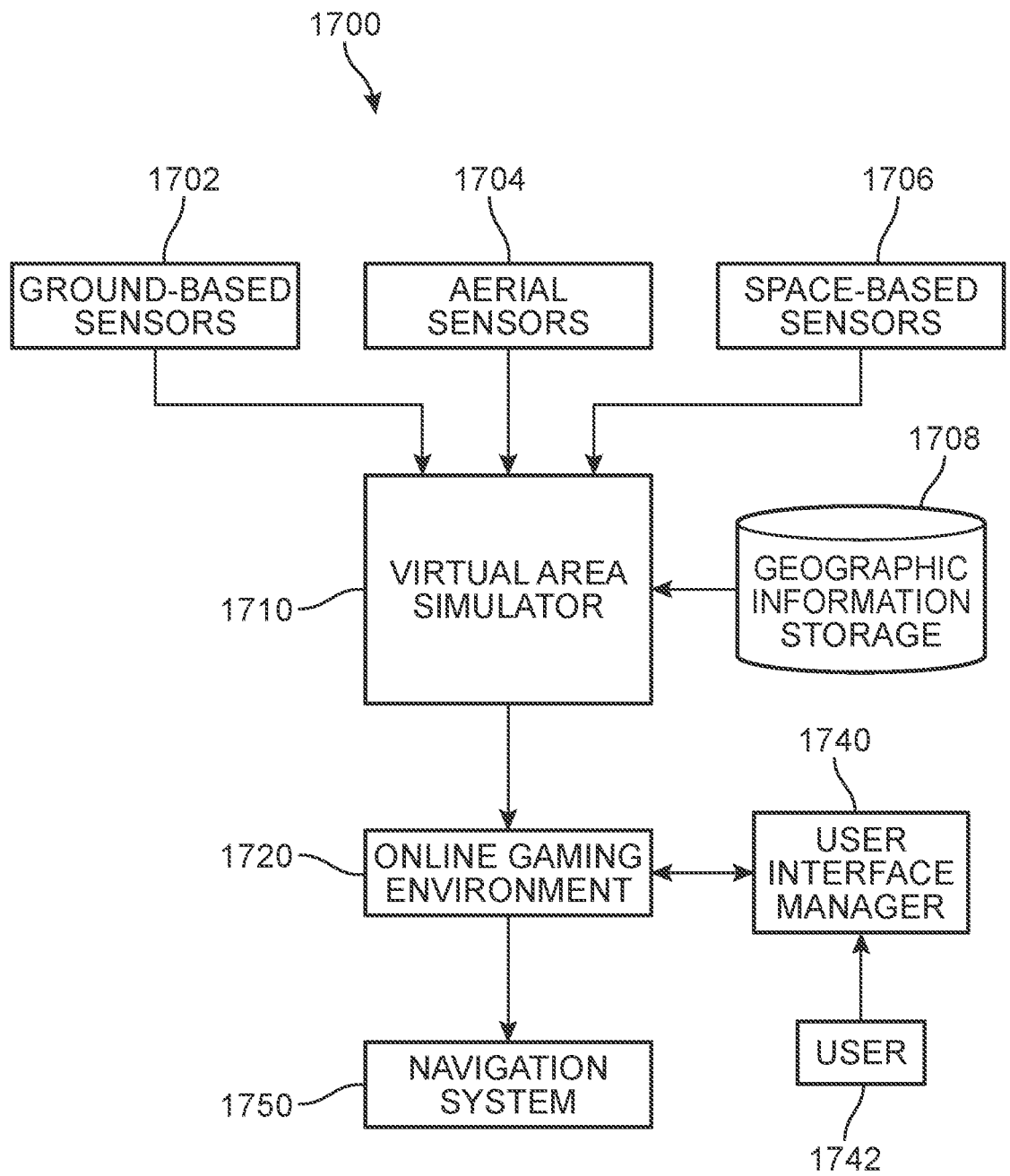
FIG. 17 shows the system architecture of a system that uses gaming to find optimum routes through areas with damaged roads and infrastructure, according to an embodiment.

FIG. 17 shows illustrates the system architecture of a system that uses gaming to find optimum routes through areas with destroyed roads and infrastructure, according to an embodiment, at system 1700.

The system 1700 in FIG. 17 includes virtual area simulator 1710. A virtual area simulator 1710 receives input data from various sources to generate a virtual simulation of the area. The simulation provides for interaction with users during gameplay. Such a virtual area simulator 1710 draws on information about the area to create the simulation.

Information about the effects of the disaster on the area for simulation purposes may be collected from a variety of information sources. For example, FIG. 17 shows that ground-based sensors 1702, aerial sensors 1704, and space-based sensors 1706 may provide information to virtual area simulator 1710.

The ground-based information sensors 1702 may include information from mobile and static ground-based information sources. For example, mobile ground-based information sources may include people on the ground or remotely controlled robots, while static ground-based information sources may include a security camera or a traffic camera.

The aerial-sensors 1704 may include information from unmanned and manned aerial information sources. For example, unmanned aerial information sources may include information from drones and other autonomous or remotely controlled aerial vehicles. Manned aerial information sources may include planes, helicopters, and other aerial vehicles piloted by at least one human being who is present in the vehicle.

The space-based sensors 1706 may include information from satellites, information from space vehicles, and information from space stations. Generally, the space-based sensors 1706 are part of a satellite that gathers information as part of its orbit.

For example, the information may include photographic representations of the area affected by the disaster. However, the information may also include information gathered using other types of sensors, such as radar, microphones, infrared cameras, thermal sensors, etc.

Embodiments also receive information gathered from various sources to represent the area's usual state. Then, embodiments initialize the virtual simulation to model the area in its usual/previous state (i.e., a state prior to the disaster). For example, the virtual area simulator 1710 may access information gathered prior to a disaster from geographic information storage 1708. Geographic information storage 1708 may be an information repository storing information about what an area was like prior to a disaster. Such information may include maps, pictures, additional sensor data, and information about landmarks and places in the area.

The virtual area simulator 1710 provides information to an online gaming environment 1720. The online gaming environment 1720 interacts with at least one user 1742 to identify routes and navigation techniques. For example, user interface manager 1740 manages the interaction. The virtual area simulator 1710, the online gaming environment 1720, and the user interface manager 1740 may be hosted together at a same machine or separately over a remote network.

The routes and navigation techniques developed in the online gaming environment 1720 are provided to a navigation system 1750 for use in actual navigation. Additional aspects of how this occurs are discussed in greater detail, below.

An important part of the operation of embodiments is the operation of the online gaming environment 1720 and the learning process it implements. The online gaming environment 1720, in combination with user interface manager 1740, uses a variety of information sources to create an interactive simulation of what it is like for a user to travel through an environment. The simulation replicates navigating a vehicle through an area with obstacles of various sorts.

For example, the user may want to drive a motor vehicle on a highway where there is a downed tree blocking the road, or the user may want to drive a motor vehicle in an area where dangerous chemicals have spilled. The simulation may reflect what it is like to drive a certain kind of vehicle. The type of vehicle also affects what a user 1742 is able to do in the simulation when dealing with obstacles and finding routes.

Figure 18:
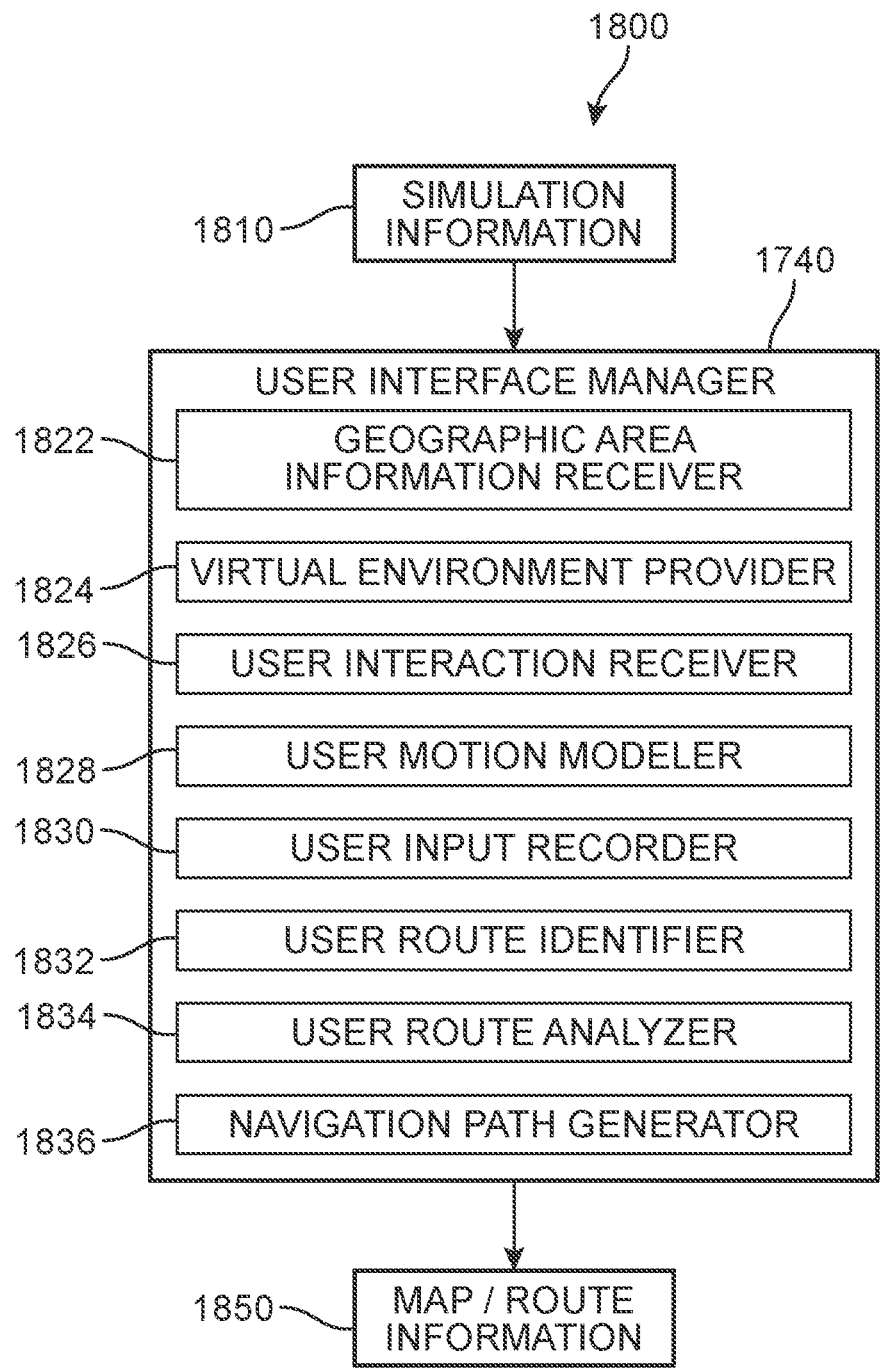
FIG. 18 shows the architecture of user interface manager for the system of FIG. 17, according to an embodiment.

The following description characterizes the online game environment 1720. All or part of the described features may also be performed at user interface manager 1740. FIG. 18 further details user interface manager as element 1740, below, in the embodiment of FIG. 18.

The online game environment 1720 begins by generating a representation of the real world produced based on data gathered by virtual area simulator 1710. The goal of the online game environment 1720 is to create a trained model of the virtual area. The online game environment 1720 establishes an initial model. The online game environment 1720 then may train the model by offering users an opportunity to interact with the model so that the model includes a variety of routes. As part of the learning, the routes are associated with various metrics of their respective desirability.

The simulation of the real world corresponds to an area affected by a natural or a man-made emergency. The map may also include before and after information to clarify the effects of the emergency. The map may also include data for how the environment was navigated before the disaster. In general, obstacles will be static obstacles, but in other cases, the obstacles may themselves have dynamic aspects.

For example, a downed tree will just remain immobile. By contrast, if there is a broken water main, the spilled water will change over time. Ideally, the simulation will reflect this change. The simulation may need to represent ways to navigate the affected area based on arbitrary changes to the simulation. For example, in a scenario where there is a broken water main, a route that is valid two hours after the water main breaks may no longer be available after five hours. As noted above, weather may affect navigation, and weather will also change over time.

Thus, it may be helpful to gather information by the virtual area simulator 1710 and pass such information to the online gaming environment 1720. By sharing the information, a simulation of the area can be changed to simulate arbitrary changes to the environment over time. For example, in an area where there is a chemical spill, the virtual area simulator 1710 may gather information about the area two hours after the spill and again four hours after the spill. The virtual area simulator 1710 uses the data to forecast what the area will be like in twelve hours, if a user desires to navigate the environment at that point in time.

The online game environment 1720 may include data identifying locations and properties all or some of the obstacles and hazards (downed trees, powerlines, radioactive areas, etc.). For example, the disaster may be a hurricane. It is important to manage the outcome of the hurricane (or other disaster). Thus, the online game environment 1720 may store that a downed tree is located in a certain location. The online game environment 1720 may also store physical properties of the downed tree, such as its shape, hardness, and interactive aspects such as that the downed tree is not toxic. A chemical spill might be flagged as toxic. Other dangers might include metrics of other dangerous properties, such as radioactivity, a biological threat, a temperature extreme (hot/cold), or an electrical shock hazard.

Embodiments may use photographs and/or images to locate obstacles and/or hazards in photos/images of affected areas. However, embodiments may also use other sensed data (thermal, infrared, radioactive, sonar, radar, etc.) There may also be other objects included in the simulation for greater realism that may be omitted or only partially simulated. For example, there may be grass or trees lining the side of a road in a simulation. Such objects are only background, and are not an emphasis of the simulation.

The simulation does not need as much information about such background features as the obstacles that are the focus of the game. Thus, the simulation may store general characteristics of such background features, but may not have the same level of associated detail. Accordingly, the simulation may balance the desire for accuracy that will make gameplay relevant to modeling actual use cases and using abstraction. The simulation ensures that the complexity of the simulation is not such that the processing and memory requirements to host the simulation become impractical.

The online gaming environment 1720 lets one or more users play through a simulation of the damaged area. An advantageous aspect of the online gaming environment 1720 lies, at least, in potentially creating a model, possibly using artificial intelligence (AI) and machine learning (ML). The model creates synthetic maps and optimal routes. Such maps and routes facilitate navigating a disaster area based on capturing and analyzing user interactions with an established simulation. As noted, such simulations may also represent weather effects.

For example, such an AI may be used in the context of vehicle navigation to automatically develop routes and automatically pilot vehicles. It is possible to crowdsource having users interact with the simulation so that the users can experiment and interact with the simulation. The AI learns from the users interaction with the simulation, where the users will automatically identify good routes by trying to be successful when playing the game. Aspects of what constitutes a "good" route is discussed further, below.

As users play, the online gaming environment 1720, along with user interface manager 1740, observes which routes the users follow and which routes the users avoid. That is, the online gaming environment 1720 tracks and records the users' gameplay. The online gaming environment 1720, based on the gameplay, identifies starting points and destination points, extracts routes, and then analyzes the extracted routes for potential optimality and the possibility to avoid or otherwise manage problems from obstacles.

The online gaming environment 1720 also tracks elements of the routes besides mere location information, such as if the routes involve manipulating parts of the routes. The steps of routes generally involve movement through the area. For example, the routes may involve tracking actions of steering, braking, and acceleration by a vehicle. However, routes may also involve other actions, such as by a user or by a vehicle.

For example, a user may use a motorcycle to navigate from an initial point to an intermediate point where a pickup truck is located, and then transition from the motorcycle to the pickup truck. After the transition, the navigation is completed from the intermediate point to a final point in the pickup truck. However, this is merely a non-limiting example, and it will be understood that the number of vehicles is not limited to one or two, and the number of vehicle changes is not limited.

Moreover, routes may also involve a user exiting a vehicle, manipulating an aspect of the simulated environment, and re-entering the vehicle. For example, the user may drive up to a trash can that has been knocked into the road, exit a vehicle, move the trash can out of the way, get back into his or her vehicle, and continue driving.

The online gaming environment 1720 may also allow the use of pedestrians and/or non-powered vehicles such as bicycles. For example, instead of operating a vehicle to navigate through an affected area, a user may direct an avatar that represents walking through an affected area, or may direct simulating biking through an affected area.

Users are provided with choices about how to follow routes in the simulation by interacting with the simulation. The main forms of interaction are first-person interaction or third-person interaction, when operating a motor vehicle, as discussed above. Such interaction allows the users to navigate the vehicle in a way that lends the choices meaning in the real world.

Users may use different ways and devices to control their simulated vehicles and/or simulated motion of such simulated vehicles throughout the simulation. Users control the simulated vehicle using at least one input device, at least one control device, and/or at least one interface device. For example, users may use, as an input device, a control device, and/or an interface device, at least one of a keyboard, a mouse, a trackpad, a trackball, a trackpoint, a joystick and throttle, a gamepad, a controller pad, a wheel, pedals, wireless VR controllers, and so on. However, these are not to be taken as limiting and any means that is indicative of a user's intentions when operating a vehicle or directing motion of an avatar may be used.

For example, a user may also give voice commands or use any other means that allows the user to make choices about how to simulate operating the vehicle. It may be most valuable to use controllers that are similar to controllers that would ordinarily be used when operating a vehicle, such as a wheel and pedals. Such controls generate data that is more readily converted into directions for use in actual navigation.

These inputs can be logged explicitly or distilled into commands they represent. For example, logging explicitly may record exactly which inputs a user enters on a controller. By contrast, the commands may be processed to indicate steering in a certain way. For example, pressing certain keys on a keyboard may be interpreted as corresponding to moving forward a certain distance while steering right in a certain way.

Users will generally experience the environment through a monitor and speakers, thought certain variants are possible, such as a VR headset, headphones or earbuds, or various haptic feedback devices. The online gaming environment 1720 may also analyze and record relationships between what the user experiences and how he or she controls his or her avatar in the game. For example, the online gaming environment 1720 may note that some users tend to try going around certain types of obstacles, while other users tend to interact with certain types of obstacles to drive over them.

Users will generally encounter discrete obstacles. Examples of discrete obstacles include a fallen tree, downed electrical lines, and contaminated water. The imagery provides an approximation of the landscape of the disaster area. By considering the approximated obstacles, users may determine how best to deal with the obstacles to generate appropriate routes.

The online gaming environment 1720 learns over time by monitoring the actions taken by the users. The online gaming environment 1720 analyzes the actions. Based on the analysis, the online gaming environment 1720 determines how the actions provide routes and how effective or ineffective those routes are. Accordingly, the online gaming environment 1720 may determine an optimal route for use in navigation.

The online gaming environment 1720 may provide the ability to use intermediate points when establishing routes. For example, the users establish ways to cross over or avoid a downed tree, and establish an intermediate point, that is past the downed tree. The user may then find routes continuing to cross over or avoid a downed power line to reach a destination point, where the destination point is past both of these obstacles.

The online gaming environment 1720 may use various machine learning techniques to infer prefer preferred routes based on the gameplay of the users. For example, the online gaming environment 1720 may use supervised learning, unsupervised learning, and/or reinforcement learning. For example, supervised learning uses known training examples. In supervised learning, the online gaming environment 1720 may have pre-existing knowledge about routes. Online gaming environment 1720 may compare user-generated routes to the pre-existing routes to determine which routes are the best. In unsupervised learning, the online gaming environment 1720 may collect data about routes users take and analyze the data to find patterns, such as clusters or labels to glean insights from the data. In reinforcement learning, the online gaming environment 1720 may have users navigate through the area repeatedly, and reinforce better routes while avoiding worse routes. The reinforcement is based on criteria that discriminate between better routes and worse routes.

Based on the input received from the users, the users may contribute data to train a model of the virtual area, in which the user interaction trains the model. The trained model reflects costs of traveling from starting points to destination points. The trained model may also reflect aspects of subroutes for further use/analysis by the online gaming environment 1720.

The online gaming environment 1720 provides the ability to learn ways to cope with obstacles to either overcome or detour around the obstacles. The learning is customized based the type of vehicle a user uses. Thus, the online gaming environment 1720 organizes and analyzes the interactions with the user in a way that allows the online gaming environment 1720 to determine optimal routes.

Thus, in some ways the approach described above is similar to a crowdsourcing approach for learning how to navigate the damaged area. The approach allows many users to repeatedly treat interacting with a virtual representation of the area as a game. As a result, the game learns over time which routes are preferable.

A goal of online game environment 1720 goal is optimizing the routes it provides to the navigation system. Various metrics may be used to optimize the routes. Such metrics may include route length, route time, route safety, and route resource consumption, as non-limiting examples. Optimizing may also use combinations of metrics. For example, the online game environment 1720 may prioritize minimal time, but also consider minimal predicted fuel consumption.

Other mapping systems merely attempt to minimize path cost. Embodiments use synthetically created data from capturing user interactions. Thus, embodiments are able to judge which routes are best so the optimal routes can be passed along for actual navigation.

The online game environment 1720 may generate routes online, as users play the game. The online game environment 1720 may instead generate routes offline, after users have played for a while and it is time to infer routes based on the gameplay.

The online game environment 1720 and the user interface manager 1740 may capture and/or store the users' routes in a variety of ways. For example, the routes may be a sequence of user input events and corresponding simulation responses. As another example, the simulation may be represented by a data structure such as a graph In such an example, the routes may indicate traversals of edges between nodes in the graph. However, these are not limiting examples, and other ways of recording the interactions between the users and the online gaming environment are possible.

The online gaming environment 1720 develops a simulation of a disaster area based on any previous data corresponding to the area and data about the effects of the disaster. Then, the online gaming environment 1720 allows a user to interact with the stimulation, track the interaction, and infer routes based on the tracked interactions.

FIG. 18 illustrates the architecture of user interface manager in interaction with online gaming environment 1720, according to an embodiment, at user interface diagram 1800. For example, FIG. 18 shows user interface manager 1740 that corresponds to user interface manager 1740 of FIG. 17. While not illustrated in FIG. 18, user interface manager 1740 is able to interact with at least one user, such as user 1742 as shown as an example in FIG. 17.

User interface manager 1740 receives simulation information 1810. For example, user interface manager 1740 gathers and processes such simulation information 1810 by using a set of components to process the simulation 1810 for interaction by users with the simulation.

For example, user interface manager 1740 may include a geographic area information receiver 1822, a virtual environment provider 1824, a user interaction receiver 1826, a user motion modeler 1828, a user input recorder 1830, a user route identifier 1832, a user route analyzer 1834, and a navigation path generator 1836, as non-limiting examples. Additional elements may be present instead of or in addition to these elements, and some of these elements may be combined into unified elements.

For example, geographic area information receiver 1822 receives the simulation information 1810. The simulation information 1810 originates from virtual area simulator 1710. Geographic area information receiver 1822 receives the simulation information 1810 from online gaming environment 1720. By receiving the simulation information 1810, the geographic area information receiver 1822 gains access to the information needed to provide the simulation.

The virtual environment provider 1824 takes the information related to the area and develops a virtual environment that acts as a game for a user to play. For example, the virtual environment provider 1824 gathers information about features of an area. The virtual environment provider 1824 then processes this information using a modeling engine so that the user is able to interact with the environment as discussed above.

The user interaction receiver 1826 receives user inputs as discussed above. The role of user interaction receiver 1826 is merely to receive raw input information. Further processing of the raw input information allows inference of intentions of a user.

The user motion modeler 1828 takes the raw inputs received by user interaction receiver 1826 and models the motion of the user based on this information. That is, user motion modeler 1828 infers how the movement of the user, such as the movement of the user's vehicle, would be affected by the input. For example, if the user is using a set of hardware steering wheel and pedals, user motion modeler 1828 infers where the simulated vehicle would travel accordingly.

A user input recorder 1830 is an element that stores information about the raw inputs provided by user interaction receiver 1826 for future reference and analysis. A user route identifier 1832 compares the motion of the vehicle provided by user motion modeler 1828 to combine it with actual map data to identify where user routes occur on the map. A user route analyzer 1834 considers routes on the map and compares the routes to at least one criterion to establish which routes are more or less effective in successfully traveling through the area. A navigation path generator 1836 determines at least one route that is most suitable for navigation, given the criteria, and given the need to avoid obstacles created by the disaster. The navigation path generator 1836 thus provides map/route information 1850, which is passed along by the online gaming environment 1720 to the navigation system 1750.

While the geographic area information receiver 1822, the virtual environment provider 1824, the user interaction receiver 1826, the user motion modeler 1828, the user input recorder 1830, the user route identifier 1832, the user route analyzer 1834, and the navigation path generator 1836 are shown as being present in user interface manager 1740, related elements may be present in online gaming environment 1720.

To provide the online game, online gaming environment 1720 and user interface manager 1740 interact. The online gaming environment 1720 provides the simulation information 1810 it receives from virtual area simulator 1710. Then, user interface manager 1740 can interact with users. User interface manager 1740 gathers the interaction information. User interface manager 1740 analyzes the interaction information, and provides map/route information 1850 back to online gaming environment 1720. Online gaming environment 1720 may share such information with users or other interested parties via navigation system 1750.

For example, the online gaming environment 1720 may register a plurality of users. Also note that one user may control multiple agents and/or avatars. The online gaming environment 1720 may allow interactive play by multiple users. Users may collaborate or otherwise interact while simulating routes.

In an example, there may be a downed tree where one user finds a route on one side of the tree and another user finds another route on the other side of the tree. Alternatively, the users could collaborate to move the tree out of the way. There may be issues where optimizing for some users is counter to the interests of other users. For example, one user may move an obstacle in a way that it reduces the threat or inconvenience to that user, but moving the obstacle interferes with the navigation of the other user.

Thus, embodiments will need to find ways to prioritize the criteria when multiple users are navigating an area. For example, an embodiment may have criteria such as minimizing navigation time costs for one user heedless of the effects on other users. Another embodiment may have a requirement that no route is acceptable when a given user would have to travel a total distance of over two miles.

Figure 19:
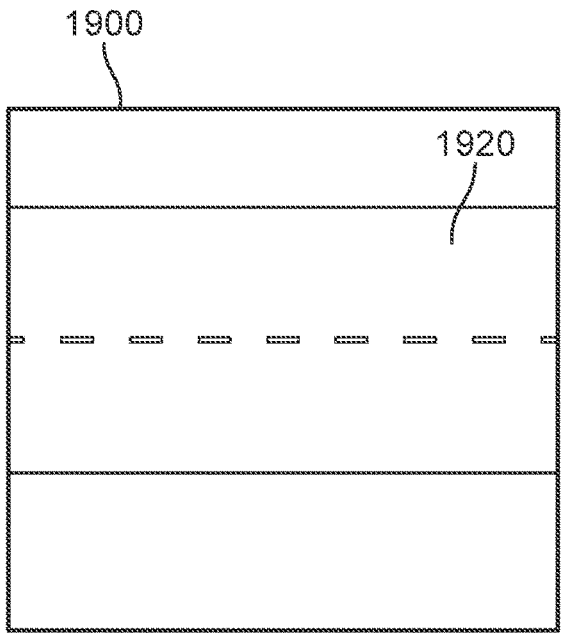
FIG. 19 shows a road before a disaster, according to an embodiment.

FIG. 19 shows a road before a disaster, according to an embodiment, at use case diagram 1900. For example, FIG. 19 shows a highway 1920 that is empty and unblocked.

Figure 20:
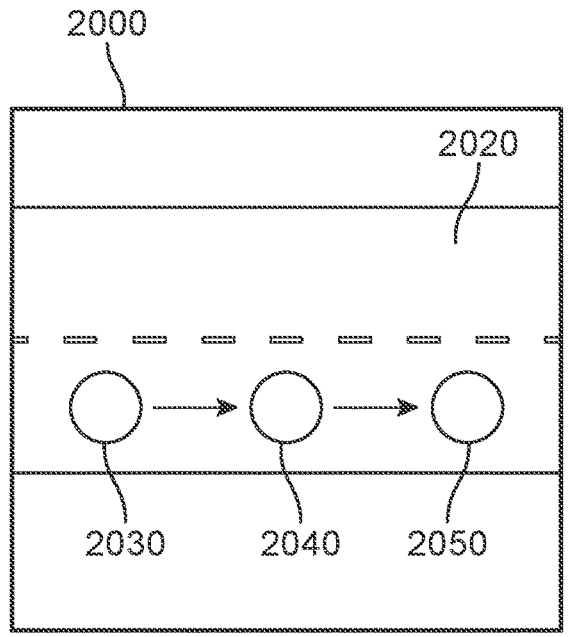
FIG. 20 shows a route on a road before a disaster, according to an embodiment.

FIG. 20 shows a route on a road before a disaster, according to an embodiment, at use case diagram 2000. For example, FIG. 20 shows a highway 2020, where a user travels uninterrupted in the right lane at 2030, 2040, and 2050 in succession.

Figure 21:
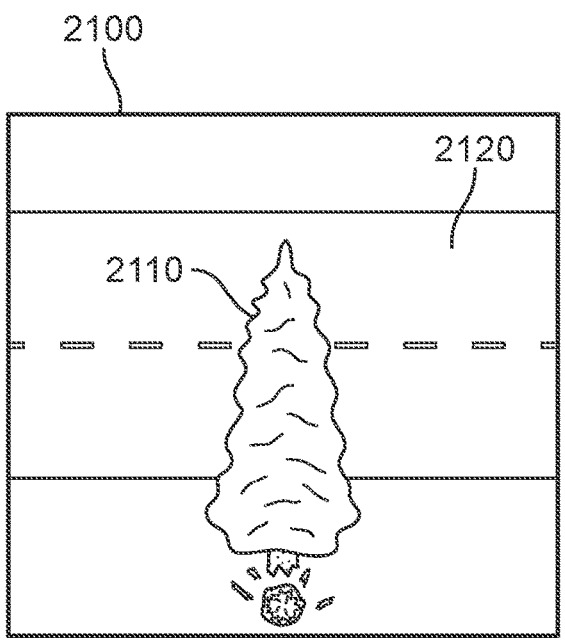
FIG. 21 shows a road after a disaster, according to an embodiment.

FIG. 21 shows a road after a disaster, according to an embodiment, at use case diagram 2100. Now, tree 2110 has collapsed onto road 2120. Accordingly, a user of this road must find a way to deal with the tree 2110 as an obstacle.

Figure 22:
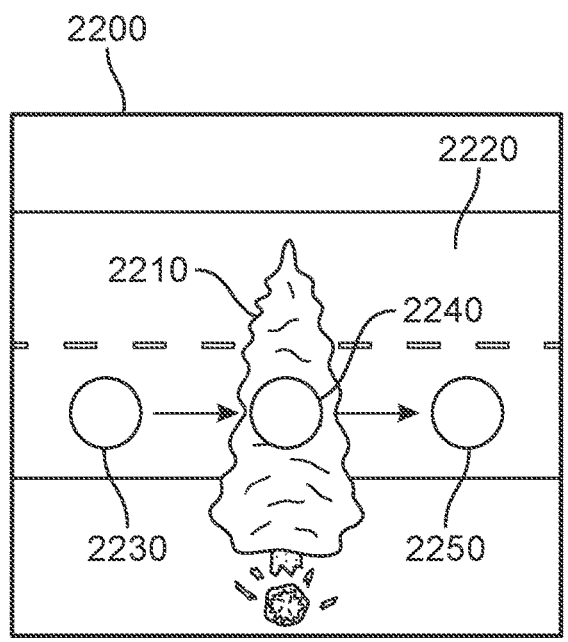
FIG. 22 shows a route on a road over a tree after a disaster, according to an embodiment.

FIG. 22 shows a route on a road over a tree after a disaster, according to an embodiment, at use case diagram 2200. FIG. 22 shows a downed tree 2210 on a road 2220. However, the user deals with the downed tree 2210 by driving over the downed tree 2210. Specifically, the user approaches at 2230, continues over the downed tree 2210 at 2240, and continues past the tree at 2250. Such a route may be possible for a vehicle with enough traction to successfully drive over the downed tree 2210. The online gaming environment 1720 and the user interface manager 1740 may record this route for further use.

Figure 23:
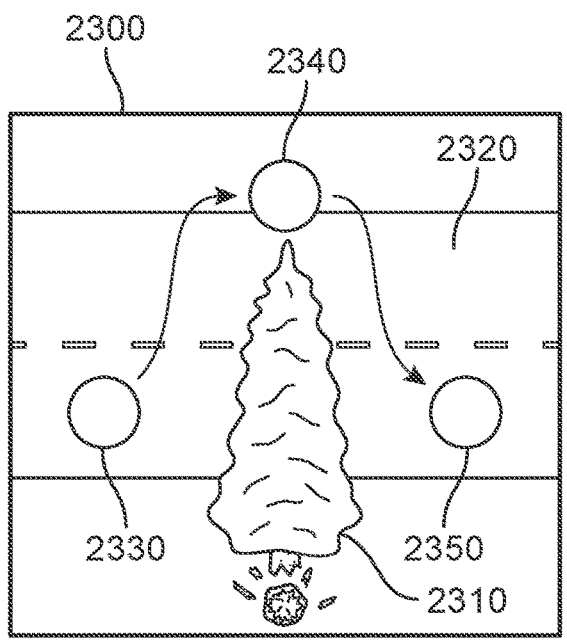
FIG. 23 shows a route on a road around a tree after a disaster, according to an embodiment.

FIG. 23 shows a route on a road around a tree after a disaster, according to an embodiment, at use case diagram 2300. FIG. 23 shows a downed tree 2310 on a road 2320. However, the user deals with the downed tree 2310 by driving over the downed tree 2310. Specifically, the user approaches at 2330, continues around the downed tree 2310 at 2340, and continues past the tree at 2350. Such a route may be possible for a vehicle with enough traction to successfully drive over the downed tree 2310. The online gaming environment 1720 and the user interface manager 1740 may record this route for further use.

Figure 24:
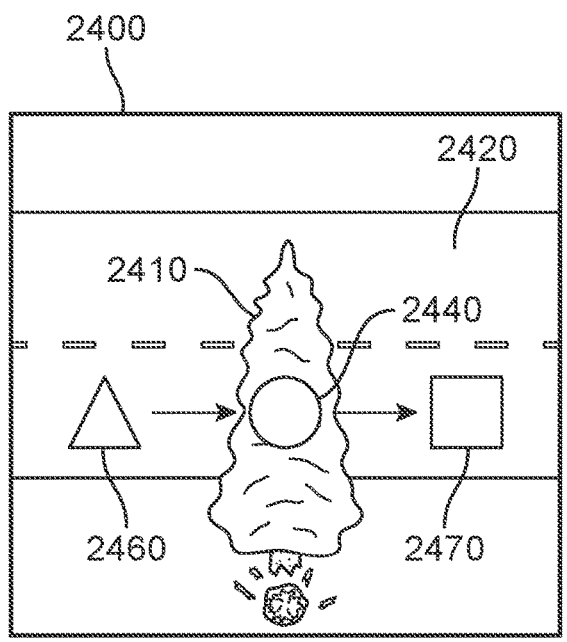
FIG. 24 shows an example of entering starting and destination points on a road after a disaster, according to an embodiment.

FIG. 24 illustrates an example of entering starting and destination points on a road after a disaster, according to an embodiment, at use case diagram 2400. For example, starting point 2460 may be shown as a triangle and destination point 2470 may be shown as a square. FIG. 24 shows an example in which the approach shown in FIG. 22 is appropriate, in that the vehicle may be well-adapted to travel over the tree 2410 that blocks road 2420. Thus, FIG. 24 provides intermediate point 2440 as showing a route over the tree 2410. This route is based on a stored route from past navigation.

Figure 25:
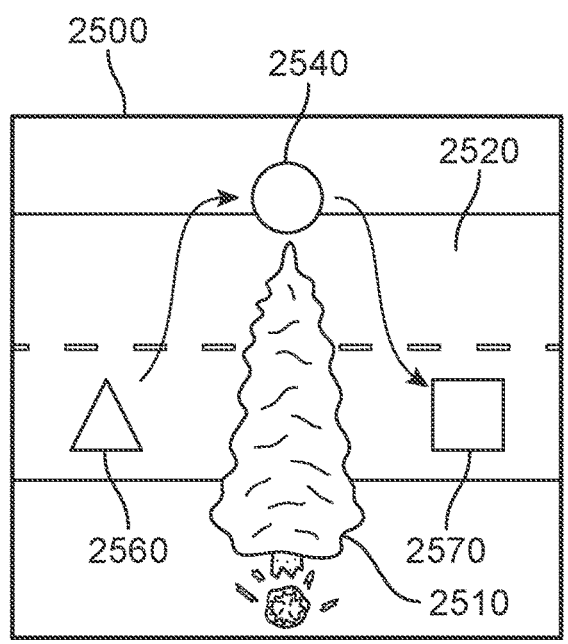
FIG. 25 shows another example of entering starting and destination points on a road after a disaster, according to an embodiment.

FIG. 25 shows an example of entering starting and destination points on a road after a disaster, according to an embodiment, at use case diagram 2500. For example, starting point 2560 may be shown as a triangle and destination point 2570 may be shown as a square. FIG. 25 shows an example in which the approach shown in FIG. 23 is appropriate, in that the vehicle may be well-adapted to travel over the tree 2510 that blocks road 2520. Thus, FIG. 25 provides intermediate point 2540 as showing a route over the tree 2510. This route is based on a stored route from past navigation.

Figure 26:
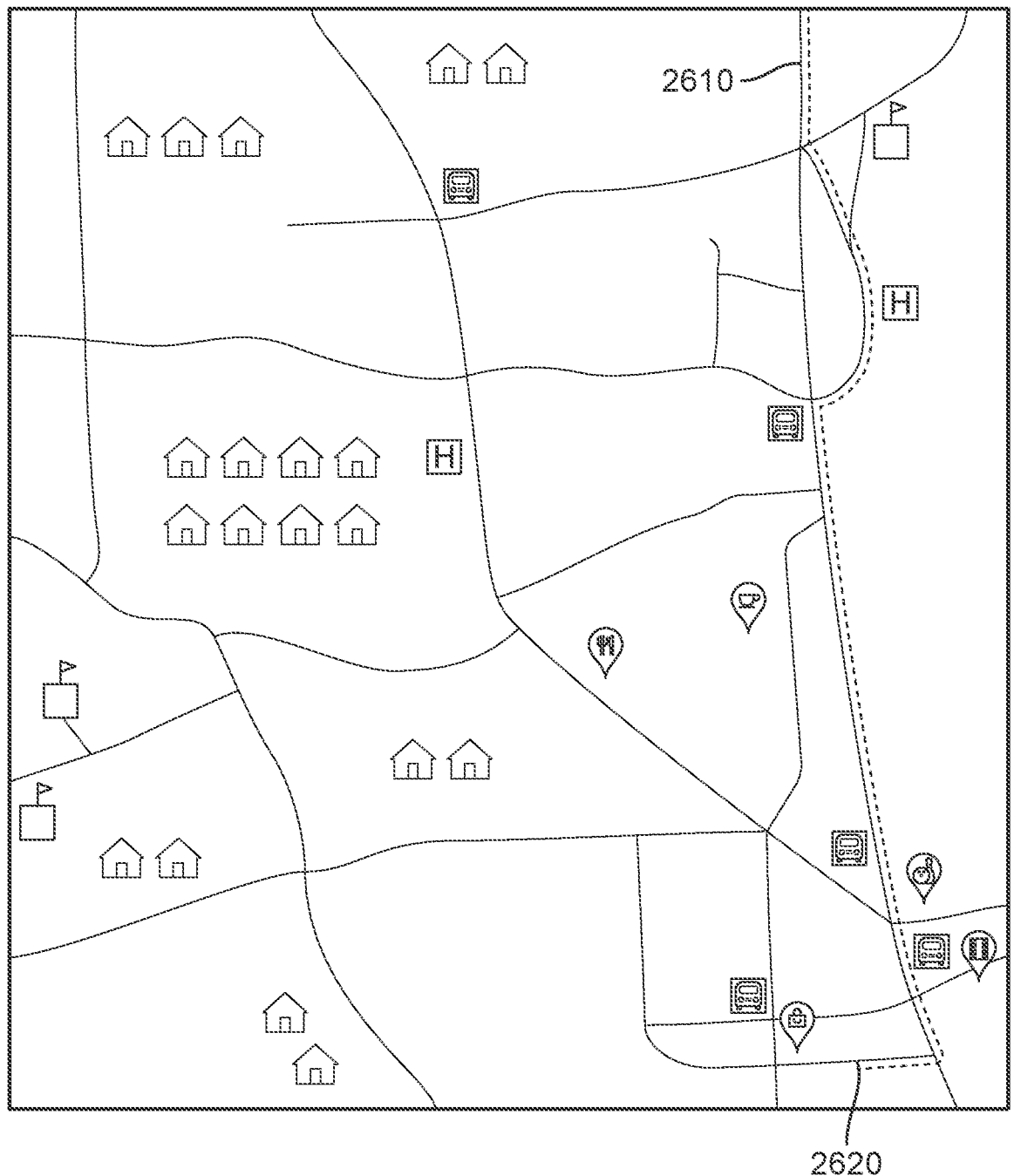
FIG. 26 is a map of an area prior to a disaster, according to an embodiment.

FIG. 26 is a map of an area prior to a disaster, according to an embodiment. For example, FIG. 26 shows a number of roads, as well as icons representing various buildings, such as houses, public transit, hospitals, restaurants, coffee shops, schools, and so on. FIG. 26 represents the geographic area prior to the occurrence of the disaster. FIG. 26 also shows a starting point 2610 and a destination point 2620. Prior to the disaster, there may be routes between these points that are preferred as being quicker (less time) or shorter (less distance) routes.

For example, FIG. 26 shows a usual route. Such a usual route may be a usual route based on a shortest distance or a shortest time period, among other criteria. In FIG. 26, it is a depiction of the area prior to a disaster, and thus the infrastructure may not be damaged. Thus, FIG. 26 shows a usual route that is essentially a straight path from starting point 2610 to destination point 2620. Such a usual route may be a least-cost route. The usual route may be found using traditional techniques. For example, the usual route of FIG. 26 is a least-time route, given ordinary road conditions.

However, the starting point 2610 and the destination point 2620 are only examples of the beginning and end points of a navigational route. For example, a user may desire to navigate from an arbitrary point on the map of FIG. 26 to another point on the map. Thus, the user uses the roads of FIG. 26 to travel in this way.

FIG. 27 is a map of the area of FIG. 26 after a disaster, with specific obstacles being marked, according to an embodiment. For example, FIG. 27 also includes several icons showing different types of damages to infrastructure. The icons point to the locations of the damage on the roads. For example, the icons show a collapsed bridge 2712, a chemical spill 2714, a fallen tree 2716, a traffic accident 2718, downed power lines 2720, a cracked road 2722, a broken traffic light 2724, and flooding 2726. These obstacles are also present in the simulation. Users will navigate around the obstacles or otherwise handle the obstacles in the simulation to get from the starting point 2610 to the destination point 2620.

To optimize routing, embodiments allow users to navigate from the starting point 2610 to the destination point 2620 repeatedly. For example, multiple users may navigate the area of FIG. 27 in a simulation. Further, individual users may each navigate the area of FIG. 27 repeatedly in the simulation. Thus, users ascertain which routes are better. To do so, users attempt to drive from starting point 2610 to ending point 2620, over and over again. Such attempts correspond to the simulated attempts discussed further, above. For example, users may interact with and control different simulated vehicles. The users may try vehicles with different attributes. Users may also direct the vehicles in different ways.

For example, the simulation may have groups of users, each driving a same type of vehicle. Each vehicle may be a motor vehicle or another vehicle. For example, a motor vehicle may be an automobile, a motorcycle, or another type of vehicle powered by a motor, or by a fuel engine. However, a vehicle may also refer to a bicycle.

As a particular example, the simulation may have two hundred users drive a jeep from the starting point 2610 to the ending point 2620. The simulation may also have two hundred users drive a sedan from the starting point 2610 to the ending point 2620. The simulation may also have two hundred users drive a Sports Utility Vehicle (SUV) from the starting point 2610 to the ending point 2620.

However, these are only examples of numbers of drivers in each group (i.e., two hundred is an arbitrary number, chosen to show that many users try to find routes). These large groups of drivers experiment with large numbers of routes. Accordingly, the simulation tries out many different routes. It is thus likely that at least one user will find an optimal route.

Additionally, individual users may simulate being a driver repeatedly navigating from the starting point 2610 to the ending point 2620. As users simulate driving repeatedly, users may remember what occurred during previous iterations of the simulation. Users then drive differently during subsequent iterations.

Accordingly, the game records each time a driver successfully completes a simulated route to navigate from the starting point 2610 to the ending point 2620. The game then communicates this information with other portions of the system for subsequent storage and analysis so that it becomes possible to compare aspects of the successful routes to assess the routes for optimality. As discussed above with respect to FIG. 4, once optimal routes are found, the system may send these routes to navigation systems used by rescuers and other people in the area to help them navigate the disaster area successfully.

For example, the system may record successful routes of different types. Subsequently, the system provides these routes as options for use in navigating from starting point 2610 to the ending point 2620. However, it is possible for the system to provide a route from an intermediate point along such a route to the ending point 2620. In such an example, the system provides a route from the intermediate point including remaining directions to the ending point 2620.

Thus, FIG. 27 shows a disaster area where the simulation effectively crowdsources simulated user responses to determine routes. The crowdsourcing assesses which routes are optimal. The simulation results may be aggregated to provide a single overall optimal route, as shown in FIG. 28. However, it is also possible to generate multiple optimal routes. For example, it is possible to generate an optimal route for each type of vehicle or for different optimality criteria. For example, one optimal route is a shortest-time route for a sedan. Another optimal route is a shortest-distance route for a motorcycle. Other aspects of such optimizing are presented in accordance with FIG. 18, above. The optimal routes reflect that some routes that would previously be possible prior to the disaster are no longer valid candidate routes.

FIG. 28 is a map of the area of FIG. 27 after a disaster, with an original route and an alternative route marked based on the obstacles, the alternative route being acquired by user interaction with a simulation, according to an embodiment. In FIG. 28, the goal is still to find a way between starting point 2610 and destination point 2620. FIG. 28 shows the usual route. However, the usual route is now obstructed by a number of disaster objects, as shown in FIGS. 27-28. Embodiments simulate routing over and over by driving a vehicle. A simulated alternative route can avoid obstacles by routing around the obstacles or otherwise handling the obstacles.

For example, the icons show a collapsed bridge 2712, a chemical spill 2714, a fallen tree 2716, a traffic accident 2718, downed power lines 2720, a cracked road 2722, a broken traffic light 2724, and flooding 2726, corresponding to the related obstacles of FIG. 27. Therefore, users experiment with alternative routes. For example, the users may make turns at intersections. Such turns may be based on viewing obstacles ahead or based on memories of unsuccessful navigation.

The users may find a way from starting point 2610 to destination point 2620. Users specifically avoid the collapsed bridge 2712, the chemical spill 2714, and the flooding 2726. The users may also avoid other obstacles such as the traffic accident 2718 and the downed power lines 2720. Users avoid less direct routes now including these obstacles. It is also possible that there will be other obstacles present that do not have a significant effect on the routing. For example, some obstacles are distant from the starting point 2610 and the destination point 2620. For example, cracked road 2722 does not have a significant effect on the routing.

For example, as shown in FIG. 28, if a user begins at starting point 2610 and follows the usual route, the user will encounter collapsed bridge 2712 and chemical spill 2714. Thus, the user may diverge from the usual route at intersection 2830 and follow an alternate route that avoids the collapsed bridge 2712 and the chemical spill 2714. However, by following this alternate route, the user may come into a proximity of the fallen tree 2716. Thus, the alternate route continues by following a route not obstructed by fallen tree 2716, at intersection 2832.

Accordingly, the alternate route branches off at intersection 2834, to avoid the flooding 2726. The alternate route then follows a branch to the destination point 2620 at intersection 2836. The alternate route also avoids the traffic accident 2718 at intersection 2838. The alternate route further avoids the downed power lines 2720 at intersection 2840.

While FIG. 28 shows a cracked road 2722, the cracked road 2722 is not near the route. Hence, the user does not generally specifically avoid the cracked road 2722 for this starting point 2610 and this destination point 2620. However, should the user decide to travel in this portion of the area, the simulation presents the cracked road 2722 and the user will need to react accordingly.

Also, FIG. 28 shows a broken traffic light 2724 on the route. The user may simply pass through this obstacle by yielding to other vehicles, rather than avoiding the broken traffic light 2724. Thus, at intersection 2842, the alternate route continues, because broken traffic light 2724 does not obstruct navigation.

Thus, FIG. 28 shows an alternate route that minimizes distance while successfully avoiding or otherwise managing the effects of obstacles. FIG. 28 is only an illustrative embodiment. Other embodiments may provide different ways of using user gameplay data to successfully navigate a geographic area affected by a disaster. As discussed above, the user gameplay data provides a practical application of simulation technology that uses a simulated game to find effective routes through obstacles in a damaged area.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A vehicle navigation system comprising a processor and machine-readable media including instructions which, when executed by the processor, cause the processor to:
   receive information about a geographic area from a virtual area simulator;
   provide a virtual environment presenting a simulation of the geographic area to a user of an online gaming system, using the information about the geographic area;
   receive input from the user to navigate through portions of the simulation while avoiding obstacles in the simulation, the input comprising actions for maneuvering a simulated vehicle from a starting point to a destination point;
   determine effects of moving the simulated vehicle through the simulation based on the actions;
   identify routes taken by the user from the starting point to the destination point, based on the effects;
   analyze the routes to identify an optimal route based on at least one criterion;
   generate map data including navigation data based on the optimal route; and
   provide the map data to a navigation system for use in navigating a user vehicle from the starting point to the destination point in the geographic area.

2. The system of claim 1, wherein the geographic area is an area affected by a disaster.

3. The system of claim 1, wherein the information about the geographic area comprises information about the geographic area gathered prior to the disaster.

4. The system of claim 1, wherein the receiving input comprises receiving input related to a type of the vehicle controlled by the user.

5. The system of claim 1, wherein the providing the virtual environment provides a first-person view of the virtual environment.

6. The system of claim 1, wherein the providing the virtual environment provides a third-person view of the virtual environment.

7. The system of claim 1, wherein the at least one criterion is at least one of route length, route time, route safety, and route resource consumption.

8. A vehicle navigation method, comprising:
   receiving information about a geographic area from a virtual area simulator;
   providing a virtual environment presenting a simulation of the geographic area to a user of an online gaming system, using the information about the geographic area;
   receiving input from the user to navigate through portions of the simulation while avoiding obstacles in the simulation, the input comprising actions for maneuvering a simulated vehicle from a starting point to a destination point;
   determining effects of moving the simulated vehicle through the simulation based on the actions;
   identifying routes taken by the user from the starting point to the destination point, based on the effects;
   analyzing the routes to identify an optimal route based on at least one criterion;
   generating map data including navigation data based on the optimal route; and
   providing the map data to a navigation system for use in navigating a user vehicle from the starting point to the destination point in the geographic area.

9. The method of claim 8, wherein the geographic area is an area affected by a disaster.

10. The method of claim 8, wherein the information about the geographic area comprises information about the geographic area gathered prior to the disaster.

11. The method of claim 8, wherein the receiving input comprises receiving input related to a type of the vehicle controlled by the user.

12. The method of claim 8, wherein the providing the virtual environment provides a first-person view of the virtual environment.

13. The method of claim 8, wherein the providing the virtual environment provides a third-person view of the virtual environment.

14. The method of claim 8, wherein the at least one criterion is at least one of route length, route time, route safety, and route resource consumption.

15. A vehicle navigation method, comprising:
   receiving information about the geographic area from a virtual area simulator;
   providing a virtual environment presenting a simulation of the geographic area to a user of the online gaming system, using the information about the geographic area;
   receiving input from the user to navigate through portions of the simulation while avoiding obstacles in the simulation, the input comprising actions for maneuvering a simulated vehicle from a starting point to a destination point;
   determining effects of moving the simulated vehicle through the simulation based on the actions;

identifying routes taken by the user from the starting point to the destination point, based on the effects;

analyzing the routes to identify an optimal route based on at least one criterion; and providing the optimal route to the user vehicle for use in navigating the user vehicle from the starting point to the destination point in the geographic area.

16. The method of claim 15, wherein the geographic area is an area affected by a disaster.

17. The method of claim 15, wherein the information about the geographic area comprises information about the geographic area gathered prior to the disaster.

18. The method of claim 15, wherein the receiving input comprises receiving input related to a type of the vehicle controlled by the user.

19. The method of claim 15, wherein the providing the virtual environment provides a first-person view of the virtual environment.

20. The method of claim 15, wherein the providing the virtual environment provides a third-person view of the virtual environment.

\* \* \* \* \*